(12) United States Patent
Yonetani et al.

(10) Patent No.: US 7,075,714 B2
(45) Date of Patent: Jul. 11, 2006

(54) ANTI-REFLECTION FILM AND MICROSCOPE HAVING OPTICAL ELEMENT WITH THE SAME ANTI-REFLECTION FILM APPLIED THERETO

(75) Inventors: Atsushi Yonetani, Tama (JP); Kunihiko Uzawa, Sagamihara (JP); Ken Kawamata, Tachikawa (JP); Yorio Wada, Hanno (JP); Nobuyoshi Toyohara, Sagamihara (JP); Takeshi Deguchi, Matsutou (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/932,055

(22) Filed: Sep. 2, 2004

(65) Prior Publication Data
US 2005/0122576 A1    Jun. 9, 2005

(30) Foreign Application Priority Data
Aug. 9, 2004   (JP) .............................. 2004-232613

(51) Int. Cl.
*G02B 21/36*   (2006.01)
*G02B 21/00*   (2006.01)
(52) U.S. Cl. ...................... 359/363; 359/368
(58) Field of Classification Search ................ 359/363, 359/368, 369, 580, 586
See application file for complete search history.

(56) References Cited

U.S. PATENT DOCUMENTS

| | | | | |
|---|---|---|---|---|
| 4,640,867 A | * | 2/1987 | Oyama et al. | 428/432 |
| 5,067,805 A | * | 11/1991 | Corle et al. | 359/235 |
| 6,819,498 B1 | * | 11/2004 | Watanabe et al. | 359/656 |
| 2005/0201422 A1 | * | 9/2005 | Ohta et al. | 372/6 |

* cited by examiner

*Primary Examiner*—Mark A. Robinson
(74) *Attorney, Agent, or Firm*—Kenyon & Kenyon LLP

(57) ABSTRACT

A microscope includes an optical element provided with an anti-reflection film applied thereto. The anti-reflection film has the following layered structure:

having first to sixth layers of films, in order from the surface of the optical element, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength $\lambda$ being "$(0.13\sim0.35)\times\lambda/4$" for the first layer, "$(0.18\sim0.75)\times\lambda/4$" for the second layer, "$(0.28\sim2.31)\times\lambda/4$" for the third layer, "$(0.26\sim0.92)\times\lambda/4$" for the fourth layer, "$(0.20\sim0.37)\times\lambda/4$" for the fifth layer, and "$(1.09\sim1.18)\times\lambda/4$" for the sixth layer.

1 Claim, 14 Drawing Sheets

------ REFRACTIVE INDEX OF BASE MATERIAL : 1.44

────── REFRACTIVE INDEX OF BASE MATERIAL : 1.57

------ REFRACTIVE INDEX OF BASE MATERIAL : 1.44

────── REFRACTIVE INDEX OF BASE MATERIAL : 1.57

——— REFRACTIVE INDEX OF BASE MATERIAL :1.57
- - - - - REFRACTIVE INDEX OF BASE MATERIAL :1.79

- - - - REFRACTIVE INDEX OF BASE MATERIAL :1.44
——— REFRACTIVE INDEX OF BASE MATERIAL :1.57

——— 8-LAYER STRUCTURE (EMBODIMENT 9)
------ 10-LAYER STRUCTURE (MODE A IN TABLE 13)
—·—·— 10-LAYER STRUCTURE (MODE B IN TABLE 13)

——— 8-LAYER STRUCTURE (EMBODIMENT 10)
— — — 9-LAYER STRUCTURE (EMBODIMENT 14)

- - - - REFRACTIVE INDEX OF BASE MATERIAL : 1.44
———— REFRACTIVE INDEX OF BASE MATERIAL : 1.57
- - - - - - REFRACTIVE INDEX OF BASE MATERIAL : 1.79

ANTI-REFLECTION FILM AND MICROSCOPE HAVING OPTICAL ELEMENT WITH THE SAME ANTI-REFLECTION FILM APPLIED THERETO

BACKGROUND OF THE INVENTION

1) Field of the Invention

The present invention relates to a microscope having an optical element that is provided with an anti-reflection film applied to a surface thereof used in ultraviolet, visible, and infrared regions.

2) Description of Related Art

In general, surfaces of optical components such as lens and prism are processed with anti-reflection films. The main purpose of this treatment is to improve transmittance of an entire optical apparatus constructed of a number of optical components, specifically, to improve brightness and conspicuousness of images by staying reflection of visible-region light. Since many of the conventional optical apparatuses have been used in the visible region or wavelengths region narrower than that, it has been only necessary for anti-reflection films also to reduce reflectance in such a narrow wavelength region.

In recent years, however, upon emergence of optical apparatuses designed for use in wider wavelength regions, anti-reflection films for the corresponding wavelength regions are required for optical components used in such apparatuses. An example of the conventional anti-reflection film for a wider wavelength region is disclosed in Japanese Patent Publication No. 2711697. In this Publication, by configuring an eight-layer structure using three materials, or $TiO_2$, $SiO_2$, and $MgF_2$, a low reflectance as not being greater than 0.8% is achieved over a wide range from the visible region to the infrared region.

Besides, for recent optical apparatuses, there are required anti-reflection films or optical components that achieve high anti-reflection performance and high transmittance in the near-ultraviolet region (350 nm~400 nm) also, in addition to the visible region (400 nm~700 nm) and the infrared region (600 nm~900 nm) In microscopy, for example, for the purpose of simultaneously proceeding the observation technique that uses light in the ultraviolet region or the infrared region as a probe, to be specific, for the purpose of observing light in the visible region and light in the infrared region emitted from a sample in response to excitation by irradiation with light in the ultraviolet region, in addition to the purpose of improving conspicuousness in the visible region for viewing by eyes, high transmittance and anti-reflection performance over the ultraviolet region through the infrared region has been much required.

SUMMARY OF THE INVENTION

An anti-reflection film according to the present invention to be applied to a base material has the following layered structure (A):

(A) having first to eighth layers of films, in order from the surface of the base material, formed of a high-refractive-index material or a low-refractive-index material for the first layer, a middle-refractive-index material for the second layer, a high-refractive-index material for each of the third, fifth and seventh layers, a low-refractive-index material or a middle-refractive-index material for each of the forth and sixth layers, and a low-refractive-index material for the eighth layer, with a range of the optical film-thickness nd of each layer in reference to the design wavelength $\lambda$ being "(0.07~1.81)×$\lambda$/4" for the first layer, "(0.32~1.30)×$\lambda$/4" for the second layer, "(0.29~0.69)×$\lambda$/4" for the third layer, "(0.07~0.39)×$\lambda$/4" for the fourth layer, "(0.67~2.28)×$\lambda$/4" for the fifth layer, "(0.21~0.49)×$\lambda$/4" for the sixth layer, "(0.28~0.42)×$\lambda$/4" for the seventh layer, and "(0.98~1.11)×$\lambda$/4" for the eighth layer.

An anti-reflection film according to the present invention to be applied to a base material has the following layered structure (B):

(B) having first to sixth layers of films, in order from the surface of the base material, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength $\lambda$ being "(0.13~0.35)×$\lambda$/4" for the first layer, "(0.18~0.75)×$\lambda$/4" for the second layer, "(0.28~2.31)×$\lambda$/4" for the third layer, "(0.26~0.92)×$\lambda$/4" for the fourth layer, "(0.20~0.37)×$\lambda$/4" for the fifth layer, and "(1.09~1.18)×$\lambda$/4" for the sixth layer.

An anti-reflection film according to the present invention to be applied to a base material has the following layered structure (C):

(C) having first to seventh layers of films, in order from the surface of the base material, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength $\lambda$ being "(1.04~1.13)×$\lambda$/4" for the first layer, "(0.30~1.46)×$\lambda$/4" for the second layer, "(0.13~0.46)×$\lambda$/4" for the third layer, "(0.56~1.26)×$\lambda$/4" for the fourth layer, "(0.22~0.56)×$\lambda$/4" for the fifth layer, "(0.31~0.41)×$\lambda$/4" for the sixth layer, and "(1.05~1.13)×$\lambda$/4" for the seventh layer.

An anti-reflection film according to the present invention to be applied to a base material has the following layered structure (D):

(D) having first to eighth layers of films, in order from the surface of the base material, formed of a high-refractive-index material for each of the first, third, fifth, and seventh layers, a low-refractive-index material for each of the second and eighth layers, and a low-refractive-index material or a middle-refractive-index material for each of the fourth and sixth layers, with a range of the optical film-thickness nd of each layer in reference to the design wavelength $\lambda$ being "(0.12~0.31)×$\lambda$/4" for the first layer, "(0.22~1,64)×$\lambda$/4" for the second layer, "(0.35~0.76)×$\lambda$/4" for the third layer, "(0.07~0.51)×$\lambda$/4" for the fourth layer, "(0.62~1.82)×$\lambda$/4" for the fifth layer, "(0.20~0.51)×$\lambda$/4" for the sixth layer, "(0.27~0.42)×$\lambda$/4" for the seventh layer, and "(0.97~1.12)×$\lambda$/4" for the eighth layer.

A microscope according to the present invention has an illumination optical system for illuminating a sample with light and an observation optical system for observation of light from the sample and is provided with an objective optical system arranged in a path of rays common to the illumination optical system and the observation optical system, wherein the observation optical system has an image-pickup optical system that picks up an image derived from light from the sample, an optical element included in the illumination optical system is provided with an anti-reflection film having the following layered structure (A):

(A) having first to eighth layers of films, in order from the surface of the optical element, formed of a high-refractive-index material or a low-refractive-index material for the first layer, a middle-refractive-index material for the second layer, a high-refractive-index material for each of the third, fifth and seventh layers, a low-refractive-index material or a middle-refractive-index material for each of the forth and sixth layers, and a low-refractive-index material for the eighth layer, with a range of the optical film-thickness nd of each layer in reference to the design wavelength $\lambda$ being "$(0.07\sim1.81)\times\lambda/4$" for the first layer, "$(0.32\sim1.30)\times\lambda/4$" for the second layer, "$(0.29\sim0.69)\times\lambda/4$" for the third layer, "$(0.07\sim0.39)\times\lambda/4$" for the fourth layer, "$(0.67\sim2.28)\times\lambda/4$" for the fifth layer, "$(0.21\sim0.49)\times\lambda/4$" for the sixth layer, "$(0.28\sim0.42)\times\lambda/4$" for the seventh layer, and "$(0.98\sim1.11)\times\lambda/4$" for the eighth layer, and an optical element included in the image-pickup optical system is provided with an anti-reflection film having the following layered structure (B) or the layered structure (C):

(B) having first to sixth, layers of films, in order from the surface of the optical element, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength $\lambda$ being "$(0.13\sim0.35)\times\lambda/4$" for the first layer, "$(0.18\sim0.75)\times\lambda/4$" for the second layer, "$(0.28\sim2.31)\times\lambda/4$" for the third layer, "$(0.26\sim0.92)\times\lambda/4$" for the fourth layer, "$(0.20\sim0.37)\times\lambda/4$" for the fifth layer, and "$(1.09\sim1.18)\times\lambda/4$" for the sixth layer;

(C) having first to seventh layers of films, in order from the surface of the optical element, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength $\lambda$ being "$(1.04\sim1.13)\times\lambda/4$" for the first layer, "$(0.30\sim1.46)\times\lambda/4$" for the second layer, "$(0.13\sim0.46)\times\lambda/4$" for the third layer, "$(0.56\sim1.26)\times\lambda/4$" for the fourth layer, "$(0.22\sim0.56)\times\lambda/4$" for the fifth layer, "$(0.31\sim0.41)\times\lambda/4$" for the sixth layer, and "$(1.05\sim1.13)\times\lambda/4$" for the seventh layer.

In the microscope, it is preferable that the illumination optical system is configured to illuminate the sample with exciting light and that the observation optical system is configured to pick up fluorescence emitted from the sample with the image-pickup optical system.

Also, in the microscope, it is preferable that the observation optical system has, between the image-pickup optical system and the objective optical system, an absorption filter that transmits fluorescence wavelength and interrupts light with wavelengths shorter than the fluorescence wavelength, that the illumination optical system has, in a path of rays that perpendicularly intersects a path of rays between the absorption filter in the observation optical system and the objective optical system, a light source, a lens for irradiating the sample with light from the light source, and an excitation filter that, of light transmitted through the lens, transmits exciting light and interrupts light with wavelengths other than the exciting light, and that, at a position where the path of rays between the absorption filter in the observation optical system and the objective optical system intersects the perpendicularly intersecting path of rays, there is provided a dichroic mirror that reflects the exciting light transmitted through the excitation filter to introduce it toward the objective optical system and that transmits light with wavelengths other than the exciting light to introduce it toward the absorption filter.

A microscope according to the present invention has an illumination optical system for illuminating a sample with light and an observation optical system for observation of light from the sample, wherein the observation optical system has an image-pickup optical system that picks up an image derived from light from the sample, and an optical element arranged in a path of rays from the illumination optical system through the image-pickup optical system is provided with an anti-reflection film having the following layered structure (B) or the layered structure (C):

(B) having first to sixth layers of films, in order from the surface of the optical element, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength $\lambda$ being "$(0.13\sim0.35)\times\lambda/4$" for the first layer, "$(0.18\sim0.75)\times\lambda/4$" for the second layer, "$(0.28\sim2.31)\times\lambda/4$" for the third layer, "$(0.26\sim0.92)\times\lambda/4$" for the fourth layer, "$(0.20\sim0.37)\times\lambda/4$" for the fifth layer, and "$(1.09\sim1.18)\times\lambda/4$" for the sixth layer;

(C) having first to seventh layers of films, in order from the surface of the optical element, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength $\lambda$ being "$(1.04\sim1.13)\times\lambda/4$" for the first layer, "$(0.30\sim1.46)\times\lambda/4$" for the second layer, "$(0.13\sim0.46)\times\lambda/4$" for the third layer, "$(0.56\sim1.26)\times\lambda/4$" for the fourth layer, "$(0.22\sim0.56)\times\lambda/4$" for the fifth layer, "$(0.31\sim0.41)\times\lambda/4$" for the sixth layer, and "$(1.05\sim1.13)\times\lambda/4$" for the seventh layer.

Also, in the microscope, it is preferable that the illumination optical system has a light source, an infrared transmitting filter, a polarizer, a DIC prism arranged on the sample side of the polarizer, and a condenser lens that illuminates the sample, and that the observation optical system has an objective optical system that collects light transmitted through the sample, a Nomarski prism, an analyzer, a path-splitting member that splits light passing the analyzer, an eyepiece optical system arranged in one of split paths split by the path-splitting member, and an image-pickup optical system arranged in the other of the split paths.

A microscope according to the present invention has a reflecting illumination optical system for laying a sample under reflecting illumination with light, a transmitting illumination optical system for laying the sample under transmitting illumination with light and an observation optical system for observation of light from the sample, and is provided with an objective optical system arranged in a path of rays common to the reflecting illumination optical system and the observation optical system, wherein the observation optical system has, in the respective two split paths of rays, image-pickup optical systems that pick up light from the sample, an optical element included in the reflecting illumination optical system is provided with an anti-reflection film having the following layered structure (A):

(A) having first to eighth layers of films, in order from the surface of the optical element, formed of a high-refractive-index material or a low-refractive-index material for the first layer, a middle-refractive-index material for the second layer, a high-refractive-index material for each of the third, fifth and seventh layers, a low-refractive-index material or a middle-refractive-index material for each of the forth and sixth layers, and a low-refractive-index material for the eighth layer, with a range of the optical film-thickness nd of each layer in reference to the design wavelength $\lambda$ being "$(0.07\sim 1.81)\times\lambda/4$" for the first layer, "$(0.32\sim 1.30)\times\lambda/4$" for the second layer, "$(0.29\sim 0.69)\times\lambda/4$" for the third layer, "$(0.07\sim 0.39)\times\lambda/4$" for the fourth layer, "$(0.67\sim 2.28)\times\lambda/4$" for the fifth layer, "$(0.21\sim 0.49)\times\lambda/4$" for the sixth layer, "$(0.28\sim 0.42)\times\lambda/4$" for the seventh layer, and "$(0.98\sim 1.11)\times\lambda/4$" for the eighth layer, and at least an optical element included in one of the two image-pickup optical systems is provided with an anti-reflection film having the following layered structure (B) or the layered structure (C):

(B) having first to sixth layers of films, in order from the surface of the optical element, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength $\lambda$ being "$(0.13\sim 0.35)\times\lambda/4$" for the first layer, "$(0.18\sim 0.75)\times\lambda/4$" for the second layer, "$(0.28\sim 2.31)\times\lambda/4$" for the third layer, "$(0.26\sim 0.92)\times\lambda/4$" for the fourth layer, "$(0.20\sim 0.37)\times\lambda/4$" for the fifth layer, and "$(1.09\sim 1.18)\times\lambda/4$" for the sixth layer;

(C) having first to seventh layers of films, in order from the surface of the optical element, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength $\lambda$ being "$(1.04\sim 1.13)\times\lambda/4$" for the first layer, "$(0.30\sim 1.46)\times\lambda/4$" for the second layer, "$(0.13\sim 0.46)\times\lambda/4$" for the third layer, "$(0.56\sim 1.26)\times\lambda/4$" for the fourth layer, "$(0.22\sim 0.56)\times\lambda/4$" for the fifth layer, "$(0.31\sim 0.41)\times\lambda/4$" for the sixth layer, and "$(1.05\sim 1.13)\times\lambda/4$" for the seventh layer.

Also, the microscope can be configured so that the observation optical system has, between the image-pickup optical system and the objective optical system, an absorption filter that transmits fluorescence wavelength and interrupts light with wavelengths shorter than the fluorescence wavelength, that the reflecting illumination optical system has, in a path of rays that perpendicularly intersects a path of rays between the absorption filter in the observation optical system and the objective optical system, a light source, a lens for irradiating the sample with light from the light source, and an excitation filter that, of light transmitted through the lens, transmits exciting light and interrupts light with wavelengths other than the exciting light, that the image-pickup optical system has a first image-pickup optical system that picks up visible light, a second image-pickup optical system that picks up light in a wavelength range from visible light through infrared light, and a path-splitting member of the image-pickup optical system that branches the first optical system and the second optical system, that the path-splitting member of the image-pickup optical system has such a spectral characteristic as to reflect infrared light and transmits light with wavelengths other than that so as to branch the first and second image-pickup optical systems, and that there is arranged, at a position where the path of rays between the absorption filter in the observation optical system and the objective optical system intersects the perpendicularly intersecting path of rays, a dichroic mirror that reflects the exciting light transmitted through the excitation filter to introduce it toward the objective optical system and transmits light with wavelengths other than the exciting light to introduce it toward the absorption filter.

In this configuration, it is preferable that at least one of optical elements provided with anti-reflection films having the layered structure (B) or (C) is an optical system that is included in, of the two image-pickup optical systems, the image-pickup optical system into which the infrared light reflected at the path-splitting member of the image-pickup optical system is introduced. Also, in this configuration, it is much preferable that the transmitting illumination optical system has a light source, an infrared transmitting filter, a polarizer, a DIC prism arranged on the sample side of the polarizer, and a condenser lens that illuminates the sample, and that a unit having a Nomarski prism and an analyzer is insertably and removably arranged between the path-splitting member and the objective optical system.

A microscope apparatus according to the present invention has an upright microscope that has a first reflecting illumination optical system for illuminating a sample with light and a first observation optical system for observation of light from the sample and that is provided with a first objective optical system arranged in a path of rays common to the first reflecting illumination optical system and the first observation optical system, and an inverted microscope that has a second reflecting illumination optical system for illuminating a sample with light and a second observation optical system for observation of light from the sample and that is provided with a second objective optical system arranged in a path of rays common to the second reflecting illumination optical system and the second observation optical system, wherein the first observation optical system has a first image-pickup optical system that picks up an image derived from light from the sample, each of an optical element included in the first illumination optical system and an optical element included in the first image-pickup optical system is provided with an anti-reflection film having the following layered structure (A):

(A) having first to eighth layers of films, in order from the surface of the optical element, formed of a high-refractive-index material or a low-refractive-index material for the first layer, a middle-refractive-index material for the second layer, a high-refractive-index material for each of the third, fifth and seventh layers, a low-refractive-index material or a middle-refractive-index material for each of the forth and sixth layers, and a low-refractive-index material for the eighth layer, with a range of the optical film-thickness nd of each layers in reference to the design wavelength λ being "(0.07~1.81)×λ/4" for the first layer, "(0.32~1.30)×λ/4" for the second layer, "(0.29~0.69)×λ/4" for the third layer, "(0.07~0.39)×λ/4" for the fourth layer, "(0.67~2.28)×λ/4" for the fifth layer, "(0.21~0.49)×λ/4" for the sixth layer, "(0.28~0.42)×λ/4" for the seventh layer, and "(0.98~1.11)×λ/4" for the eighth layer, the second observation optical system has a second image-pickup optical system that picks up an image derived from light from the sample, and each of an optical element included in the second illumination optical system and an optical element included in the second image-pickup optical system is provided with an anti-reflection film having the following layered structure (B) or the layered structure (C):

(B) having first to sixth layers of films, in order from the surface of the optical element, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength λ being "(0.13~0.35)×λ/4" for the first layer, "(0.18~0.75)×λ/4" for the second layer, "(0.28~2.31)×λ/4" for the third layer, "(0.26~0.92)×λ/4" for the fourth layer, "(0.20~0.37)×λ/4" for the fifth layer, and "(1.09~1.18)×λ/4" for the sixth layer;

(C) having first to seventh layers of films, in order from the surface of the optical element, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength λ being "(1.04~1.13)×λ/4" for the first layer, "(0.30~1.46)×λ/4" for the second layer, "(0.13~0.46)×λ/4" for the third layer, "(0.56~1.26)×λ/4" for the fourth layer, "(0.22~0.56)×λ/4" for the fifth layer, "(0.31~0.41)×λ/4" for the sixth layer, and "(1.05~1.13)×λ/4" for the seventh layer.

A microscope according to the present invention is a laser-scanning confocal fluorescence microscope that includes a laser light source section, an objective optical system that focuses exciting light from the laser light source section on a sample, a scanning device that scans a surface of the sample with the exciting light from the laser light source section, a pupil projecting lens arranged between the scanning device and the objective optical system, and at least one detecting optical system that detects fluorescence emitted from the sample and passing the objective optical system and the pupil projecting lens, wherein the objective optical system has an objective lens and an imaging lens for forming an intermediate image of the sample, the configuration is made so that the a back focal position of the objective lens is made conjugate with a position in the vicinity of the scanning device by the imaging lens and the pupil projecting lens, an optical element arranged in a path of rays from the laser light source section through the sample is provided with an anti-reflection film having the following layered structure (A):

(A) having first to eighth layers of films, in order from the surface of the optical element, formed of a high-refractive-index material or a low-refractive-index material for the first layer, a middle-refractive-index material for the second layer, a high-refractive-index material for each of the third, fifth and seventh layers, a low-refractive-index material or a middle-refractive-index material for each of the forth and sixth layers, and a low-refractive-index material for the eighth layer, with a range of the optical film-thickness nd of each layer in reference to the design wavelength λ being "(0.07~1.81)×λ/4" for the first layer, "(0.32~1.30)×λ/4" for the second layer, "(0.29~0.69)×λ/4" for the third layer, "(0.07~0.39)×λ/4" for the fourth layer, "(0.67~2.28)×λ/4" for the fifth layer, "(0.21~0.49)×λ/4" for the sixth layer, "(0.28~0.42)×λ/4" for the seventh layer, and "(0.98~1.11)×λ/4" for the eighth layer, and an optical element included in each of the at least one set of the detecting optical system is provided with an anti-reflection film having the following layered structure (B) or the layered structure (C):

(B) having first to sixth layers of films, in order from the surface of the optical element, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength λ being "(0.13~0.35)×λ/4" for the first layer, "(0.18~0.75)×λ/4" for the second layer, "(0.28~2.31)×λ/4" for the third layer, "(0.26~0.92)×λ/4" for the fourth layer, "(0.20~0.37)×λ/4" for the fifth layer, and "(1.09~1.18)×λ/4" for the sixth layer;

(C) having first to seventh layers of films, in order from the surface of the optical element, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength λ being "(1.04~1.13)×λ/4" for the first layer, "(0.30~1.46)×λ/4" for the second layer, "(0.13~0.46)×λ/4" for the third layer, "(0.56~1.26)×λ/4" for the fourth layer, "(0.22~0.56)×λ/4" for the fifth layer, "(0.31~0.41)×λ/4" for the sixth layer, and "(1.05~1.13)×λ/4" for the seventh layer.

Also, according to the present invention, at least one layer of the anti-reflection film applied to an optical element of a microscope can be replaced with an equivalent film, which includes a layer made of a material with a higher refractive index than that of the original layer and a layer made of a material with a lower refractive index than that of the original layer.

Also, an image-pickup unit according to the present invention that achieves removable mount on a microscope includes an image-pickup device having an image-pickup element that picks up and image by the microscope and a dust protection glass arranged in front of the image-pickup device, wherein the dust protection glass is provided with an anti-reflection film having the following layered structure (B) or the layered structure (C):

(B) having first to sixth layers of films, in order from the surface of the dust protection glass, formed of a high-refractive-index material for each of the first, third and fifth layers, a low-refractive-index material or a middle-refractive-index material for each of the second and fourth layers, and a low-refractive-index material for the sixth layer, with a range of the optical film-thickness nd of each layer in reference to the design wavelength λ being "(0.13~0.35)×λ/4" for the first layer, "(0.18~0.75)×λ/4" for the second layer, "(0.28~2.31)×λ/4" for the third layer, "(0.26~0.92)×λ/4" for the fourth layer, "(0.20~0.37)×λ/4" for the fifth layer, and "(1.09~1.18)×λ/4" for the sixth layer;

(C) having first to seventh layers of films, in order from the surface of the dust protection glass, formed of a middle-refractive-index material for the first layer, a high-refractive-index material for each of the second, fourth, and sixth layers, a low-refractive-index material or a middle-refractive-index material for each of the third and fifth layers, and a low-refractive-index material for the seventh layer, with a range of the optical film-thickness nd of each layer in reference to the design wavelength λ being "(1.04~1.13)×λ/4" for the first layer, "(0.30~1.46)×λ/4" for the second layer, "(0.13~0.46)×λ/4" for the third layer, "(0.56~1.26)×λ/4" for the fourth layer, "(0.22~0.56)×λ/4" for the fifth layer, "(0.31~0.41)×λ/4" for the sixth layer, and "(1.05~1.13)×λ/4" for the seventh layer.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
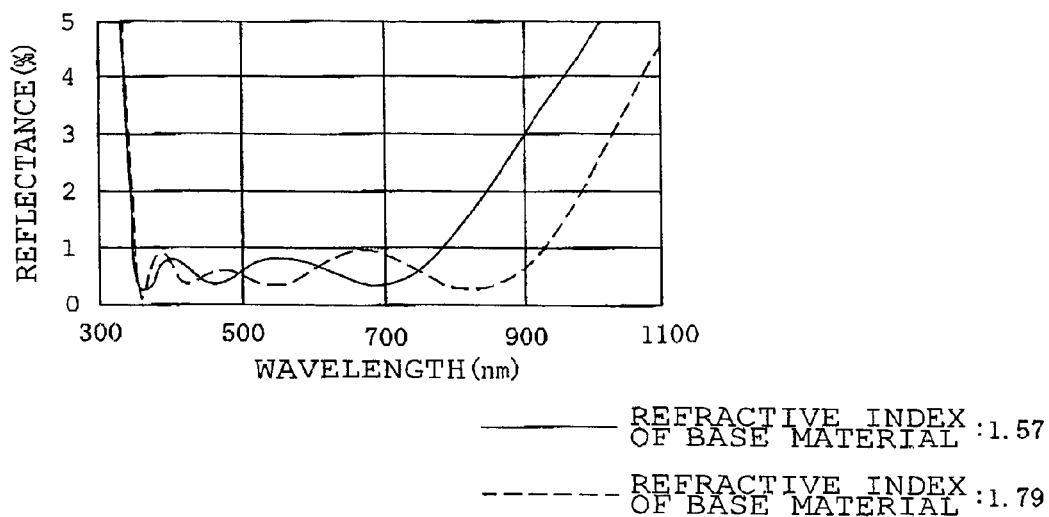
FIG. 1 is a spectral reflectance characteristic diagram of an anti-reflection film according to Embodiment 1.

Preceding the explanation of the embodiments, the function and effect of the present invention are explained below.

In a microscope having optical elements with anti-reflection films applied thereto according to the present invention, it is possible to obtain a high anti-reflection effect over a wide wavelength range from the ultraviolet region through the infrared region by designating refractive index of film material and film thickness of each layer. To be specific, an average reflectance not greater than 0.6% can be achieved over the wavelength range of 350 nm~800 nm. Also, by changing the design wavelength λ, the anti-reflection wavelength band can be shifted or widened. The material of the optical element as a base material may be crystal material, plastic or the like, not limited to glass.

Also, the optical element as a base material may take every shape such as a plane plate shape, a lens shape, and a prism shape. Method of deposition also is not specifically limited; vacuum evaporation method, sputtering method, ion plating method, etc. can be employed.

It is noted that an anti-reflecting film having the layered structure (A) achieves a higher anti-reflection effect than an anti-reflection film having the layered structure (B) or the layered structure (C).

On the other hand, the manufacture cost can be made lower for an anti-reflection film having the layered structure (B) or the layered structure (C) than for an anti-reflection film having the layered structure (A).

Therefore, in the microscope having optical elements with anti-reflection films applied thereto according to the present invention, high anti-reflection performance over a wide wavelength range from the ultraviolet region to the visible region, and further to the infrared region, can be achieved at a high cost performance.

Embodiments of anti-reflection films used in the microscope according to the present invention are described below.

Embodiment 1

An anti-reflection film according to Embodiment 1 is deposited on a base material with a refractive index of 1.57~1.79, constructed of a film structure, as shown in Table 1 below, using $Ta_2O_5$ as a high-refractive-index material for the first, third and fifth layers from the side of the base material, $Al_2O_3$ as a middle-refractive-index material for the second and fourth layers, and $MgF_2$ as a low-refractive-index material for the sixth layer, upon the design wavelength $\lambda$ being set to 500 nm.

TABLE 1

| | | Optical film-thickness (×λ/4) | |
|---|---|---|---|
| | | A | B |
| | | Base-material refractive index | Base-material refractive index |
| Layer number | Material | n = 1.57 | n = 1.79 |
| 1st layer | $Ta_2O_5$ | 0.13 | 0.31 |
| 2nd layer | $Al_2O_3$ | 0.75 | 0.26 |
| 3rd layer | $Ta_2O_5$ | 0.31 | 2.21 |
| 4th layer | $Al_2O_3$ | 0.75 | 0.39 |
| 5th layer | $Ta_2O_5$ | 0.23 | 0.31 |
| 6th layer | $MgF_2$ | 1.14 | 1.09 |

The anti-reflection film of Embodiment 1 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 1 uses $Ta_2O_5$ as a high-refractive-index material, $Al_2O_3$ as a middle-refractive index material and $MgF_2$ as a low-refractive-index material, materials are not limited to these. Any material having a similar refractive index to each of these materials can be used to obtain an anti-reflection film having an equivalent characteristic.

As shown in FIG. 1, the anti-reflection film of Embodiment 1 shows reflectances not greater than 1.0% in the wavelength range of 350 nm~800 nm, and an average reflectance not greater than 0.6% for the wavelength range of 420 nm~690 nm.

Also, an optical lens with the anti-reflection film of Embodiment 1 applied to one or both surfaces thereof has shown a good transmittance over a wide range from the ultraviolet region through the infrared region.

In this way, according to the anti-reflection film of Embodiment 1, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 2

An anti-reflection film according to Embodiment 2 is deposited on a base material with a refractive index of 1.44~1.79, constructed of a film structure, as shown in Table 2 below, using $Ta_2O_5$ as a high-refractive-index material for the first, third and fifth layers from the side of the base material, $SiO_2$ as a low-refractive-index material for the second layer, $Al_2O_3$ as a middle-refractive-index material for the fourth layer, and $MgF_2$ as a low-refractive-index material for the sixth layer, upon the design wavelength $\lambda$ being set to 500 nm.

TABLE 2

| | | Optical film-thickness (×λ/4) | | |
|---|---|---|---|---|
| | | A | B | C |
| | | Base-material refractive index | Base-material refractive index | Base-material refractive index |
| Layer number | Material | n = 1.44 | n = 1.57 | n = 1.79 |
| 1st layer | $Ta_2O_5$ | 0.16 | 0.24 | 0.35 |
| 2nd layer | $SiO_2$ | 0.60 | 0.46 | 0.18 |
| 3rd layer | $Ta_2O_5$ | 0.28 | 0.39 | 2.26 |
| 4th layer | $Al_2O_3$ | 0.92 | 0.78 | 0.39 |
| 5th layer | $Ta_2O_5$ | 0.20 | 0.23 | 0.31 |
| 6th layer | $MgF_2$ | 1.15 | 1.15 | 1.09 |

The anti-reflection film of Embodiment 2 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 2 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 2:
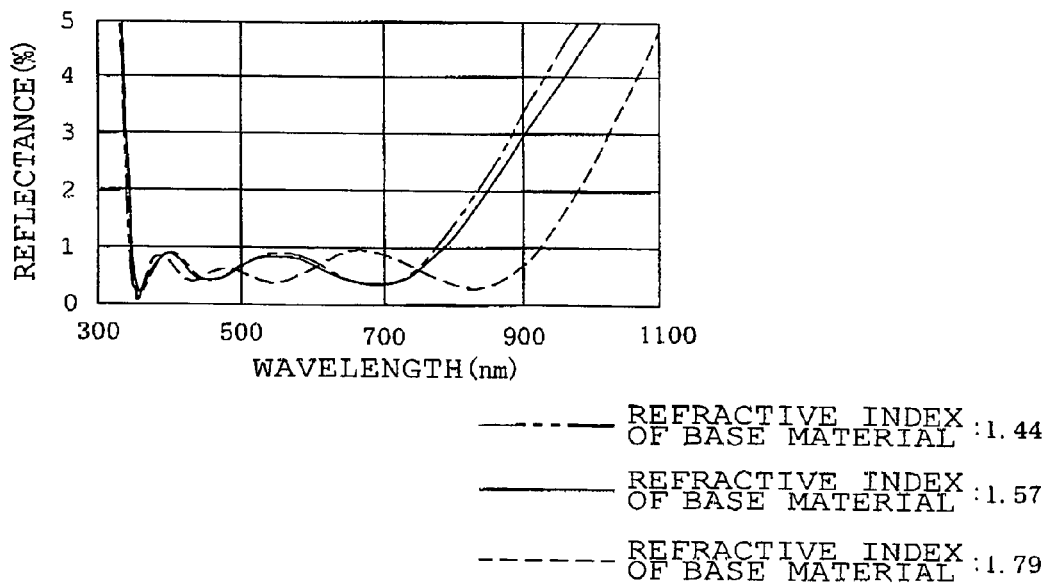
FIG. 2 is a spectral reflectance characteristic diagram of an anti-reflection film according to Embodiment 2.

As shown in FIG. 2, the anti-reflection film of Embodiment 2 shows reflectances not greater than 1.0% in the wavelength range of 350 nm~800 nm, and an average reflectance not greater than 0.6% for the wavelength range of 420 nm~690 nm.

Also, an optical lens with the anti-reflection film of Embodiment 2 applied to one or both surfaces thereof has shown a good transmittance over a wide range from the ultraviolet region through the infrared region.

In this way, according to the anti-reflection film of Embodiment 2, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 3

An anti-reflection film according to Embodiment 3 is deposited on abase material with a refractive index of 1.44~1.79, constructed of a film structure, as shown in Table 3 below, using $HfO_2$ as a high-refractive-index material for the first, third and fifth layers from the side of the base material, $SiO_2$ as a low-refractive-index material for the second and fourth layers, and $MgF_2$ as a low-refractive-index material for the sixth layer, upon the design wavelength $\lambda$ being set to 500 nm.

TABLE 3

| Layer number | Material | Optical film-thickness (×λ/4) | | |
|---|---|---|---|---|
| | | A Base-material refractive index n = 1.44 | B Base-material refractive index n = 1.57 | C Base-material refractive index n = 1.79 |
| 1st layer | $HfO_2$ | 0.17 | 0.24 | 0.35 |
| 2nd layer | $SiO_2$ | 0.63 | 0.47 | 0.18 |
| 3rd layer | $HfO_2$ | 0.38 | 0.48 | 2.31 |
| 4th layer | $SiO_2$ | 0.55 | 0.49 | 0.26 |
| 5th layer | $HfO_2$ | 0.31 | 0.32 | 0.37 |
| 6th layer | $MgF_2$ | 1.18 | 1.17 | 1.09 |

The anti-reflection film of Embodiment 3 is deposited by vacuum evaporation method in a vacuum region of $10^{-4}$–$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 3 uses $HfO_2$ as a high-refractive-index material, and $SiO_2$ and $MgF_2$ as low-refractive-index materials, materials are not limited to these. Any material having a similar refractive index to each of these materials can be used to obtain an anti-reflection film having an equivalent characteristic.

Figure 3:
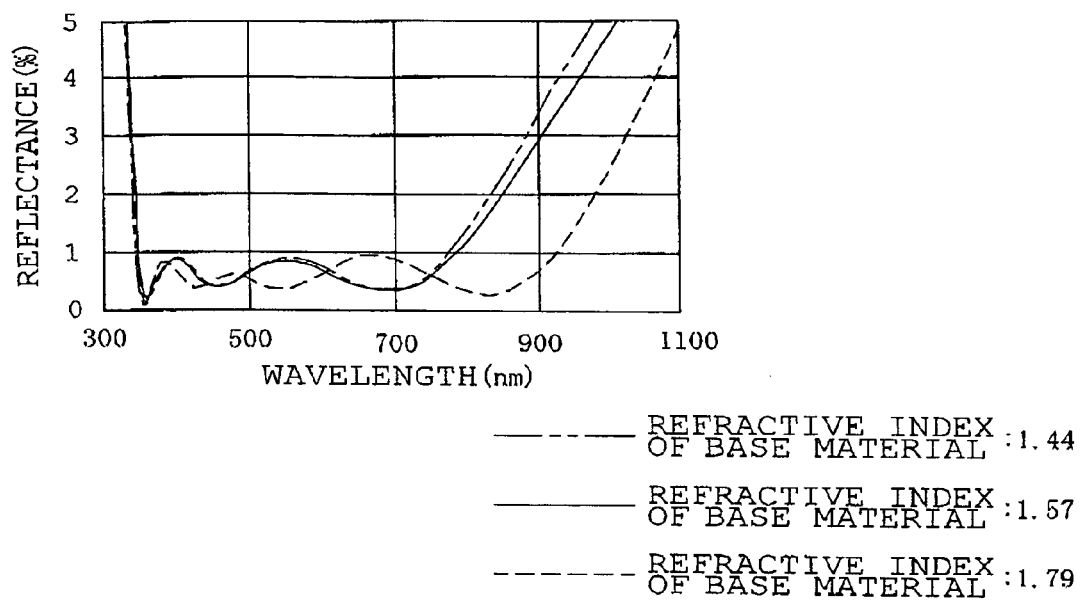
FIG. 3 is a spectral reflectance characteristic diagram of an anti-reflection film according to Embodiment 3.

As shown in FIG. 3, the anti-reflection film of Embodiment 3 shows reflectances not greater than 1.0% in the wavelength range of 350 nm–800 nm, and an average reflectance not greater than 0.6% for the wavelength range of 420 nm–690 nm.

Also, an optical lens with the anti-reflection film of Embodiment 3 applied to one or both surfaces thereof has shown a good transmittance over a wide range from the ultraviolet region through the infrared region.

In this way, according to the anti-reflection film of Embodiment 3, a high anti-reflection effect can be obtained over a wide wavelength range from the ultraviolet region through the infrared region.

Embodiment 4

An anti-reflection film according to Embodiment 4 is deposited on a base material with a refractive index of 1.44–1.57, constructed of a film structure, as shown in Table 4 below, using $Al_2O_3$ as a middle-refractive-index material for the first, third and fifth layers from the side of the base material, $Ta_2O_5$ as a high-refractive-index material for the second, fourth and sixth layers, and $MgF_2$ as a low-refractive-index material for the seventh layer, upon the design wavelength λ being set to 500 nm.

TABLE 4

| Layer number | Material | Optical film-thickness (×λ/4) | |
|---|---|---|---|
| | | A Base-material refractive index n = 1.44 | B Base-material refractive index n = 1.57 |
| 1st layer | $Al_2O_3$ | 1.04 | 1.12 |
| 2nd layer | $Ta_2O_5$ | 0.43 | 0.31 |
| 3rd layer | $Al_2O_3$ | 0.19 | 0.45 |
| 4th layer | $Ta_2O_5$ | 1.18 | 0.56 |
| 5th layer | $Al_2O_3$ | 0.32 | 0.55 |
| 6th layer | $Ta_2O_5$ | 0.36 | 0.31 |
| 7th layer | $MgF_2$ | 1.06 | 1.12 |

The anti-reflection film of Embodiment 4 is deposited by vacuum evaporation method in a vacuum region of $10^{-4}$–$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 4 uses $Ta_2O_5$ as a high-refractive-index material, $Al_2O_3$ as a middle-refractive index material, and $MgF_2$ as a low-refractive-index material, materials are not limited to these. Any material having a similar refractive index to each of these materials can be used to obtain an anti-reflection film having an equivalent characteristic.

Figure 4:
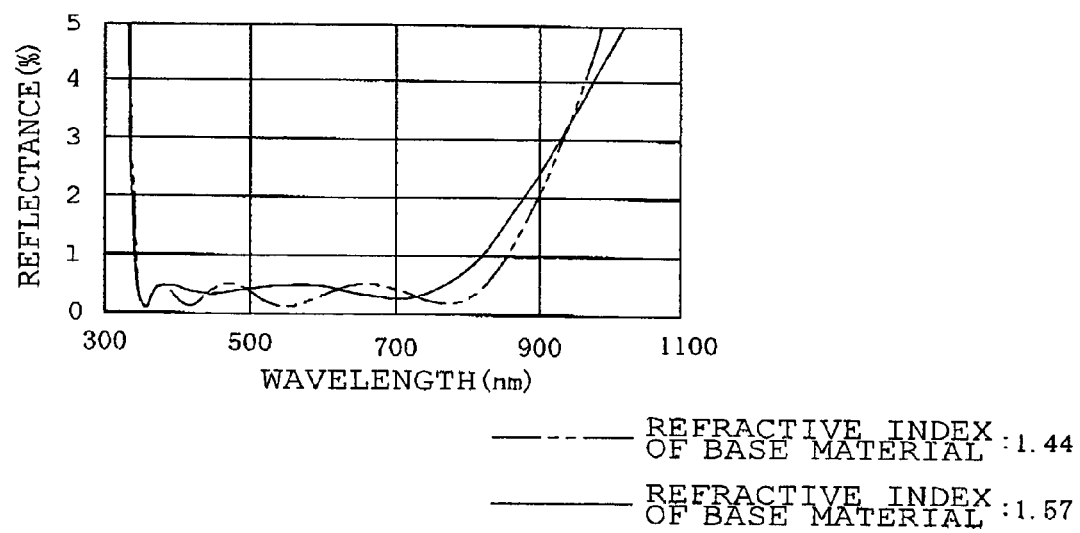
FIG. 4 is a spectral reflectance characteristic diagram of an anti-reflection film according to Embodiment 4.

As shown in FIG. 4, the anti-reflection film of Embodiment 4 shows reflectances not greater than 1.0% in the wavelength range of 350 nm–900 nm, and an average reflectance not greater than 0.6% for the wavelength range of 350 nm–800 nm.

Also, an optical lens with the anti-reflection film of Embodiment 4 applied to one or both surfaces thereof has shown a good transmittance over a wide range from the ultraviolet region through the infrared region.

In this way, according to the anti-reflection film of Embodiment 4, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 5

An anti-reflection film according to Embodiment 5 is deposited on a base material with a refractive index of 1.44–1.57, constructed of a film structure, as shown in Table 5 below, using $Al_2O_3$ as a middle-refractive-index material for the first and third layers from the side of the base material, $Ta_2O_5$ as a high-refractive-index material for the second, fourth and sixth layers, $SiO_2$ as a low-refractive-index material for the fifth layer, and $MgF_2$ as a low-refractive-index material for the seventh layer, upon the design wavelength λ being set to 500 nm.

TABLE 5

| Layer number | Material | Optical film-thickness (×λ/4) | |
|---|---|---|---|
| | | A Base-material refractive index n = 1.44 | B Base-material refractive index n = 1.57 |
| 1st layer | $Al_2O_3$ | 1.04 | 1.12 |
| 2nd layer | $Ta_2O_5$ | 0.43 | 0.30 |
| 3rd layer | $Al_2O_3$ | 0.19 | 0.46 |
| 4th layer | $Ta_2O_5$ | 1.23 | 0.61 |
| 5th layer | $SiO_2$ | 0.22 | 0.37 |
| 6th layer | $Ta_2O_5$ | 0.41 | 0.38 |
| 7th layer | $MgF_2$ | 1.05 | 1.13 |

The anti-reflection film of Embodiment 5 is deposited by vacuum evaporation method in a vacuum region of $10^{-4}$–$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 5 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 5:
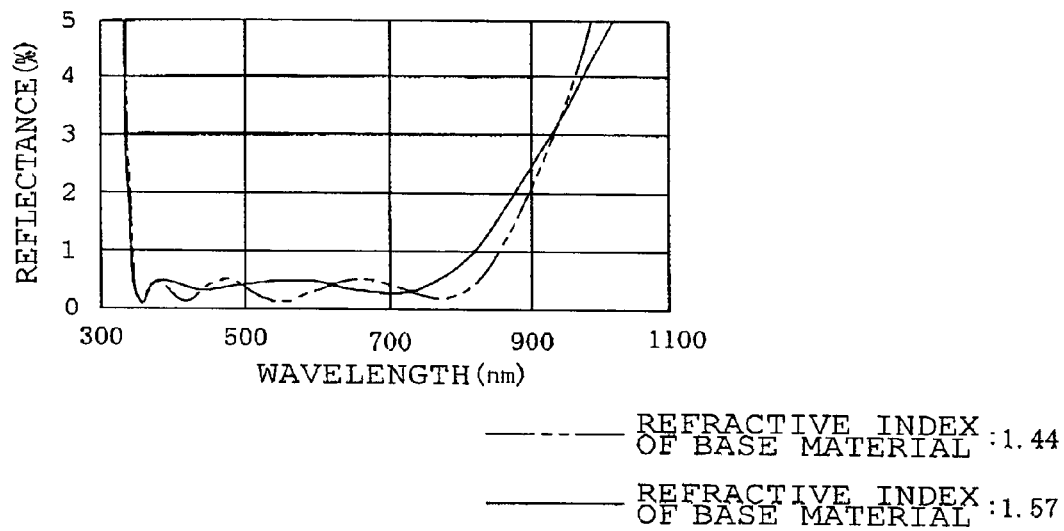
FIG. 5 is a spectral reflectance characteristic diagram of an anti-reflection film according to Embodiment 5.

As shown in FIG. 5, the anti-reflection film of Embodiment 5 shows reflectances not greater than 1.0% in the wavelength range of 350 nm~900 nm, and an average reflectance not greater than 0.6% for the wavelength range of 350 nm~800 nm.

Also, an optical lens with the anti-reflection film of Embodiment 5 applied to one or both surfaces thereof has shown a good transmittance over a wide range from the ultraviolet region through the infrared region.

In this way, according to the anti-reflection film of Embodiment 5, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 6

An anti-reflection film according to Embodiment 6 is deposited on abase material with a refractive index of 1.44~1.57, constructed of a film structure, as shown in Table 6 below, using $Al_2O_3$ as a middle-refractive-index material for the first layer from the side of the base material, $Ta_2O_5$ as a high-refractive-index material for the second, fourth and sixth layers, $SiO_2$ as a low-refractive-index material for the third and fifth layers, and $MgF_2$ as a low-refractive-index material for the seventh layer, upon the design wavelength λ being set to 500 nm.

TABLE 6

| | | Optical film-thickness (×λ/4) | |
|---|---|---|---|
| | | A | B |
| | | Base-material | Base-material |
| Layer | | refractive index | refractive index |
| number | Material | n = 1.44 | n = 1.57 |
| 1st layer | $Al_2O_3$ | 1.04 | 1.13 |
| 2nd layer | $Ta_2O_5$ | 0.46 | 0.37 |
| 3rd layer | $SiO_2$ | 0.13 | 0.30 |
| 4th layer | $Ta_2O_5$ | 1.26 | 0.68 |
| 5th layer | $SiO_2$ | 0.22 | 0.37 |
| 6th layer | $Ta_2O_5$ | 0.40 | 0.38 |
| 7th layer | $MgF_2$ | 1.05 | 1.13 |

The anti-reflection film of Embodiment 6 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 6 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 6:
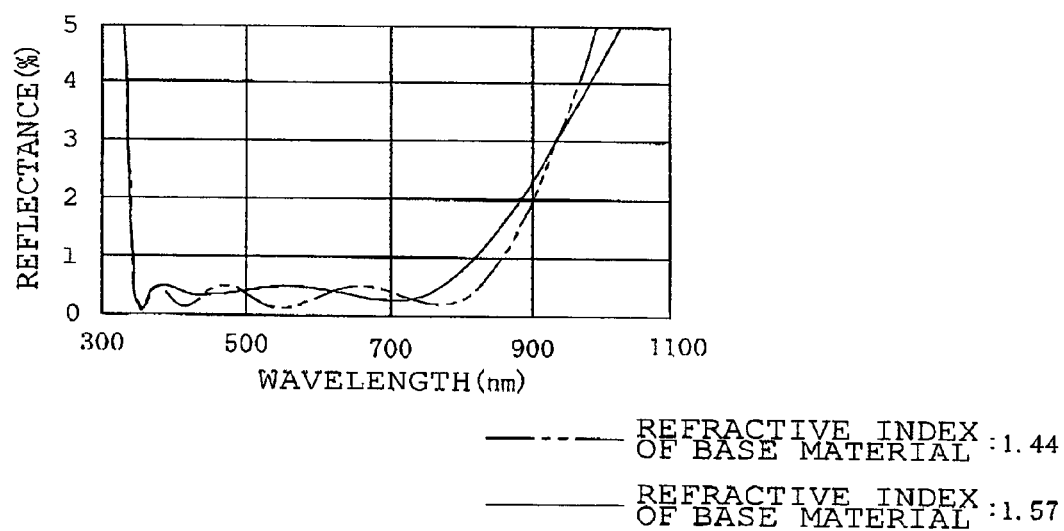
FIG. 6 is a spectral reflectance characteristic diagram of an anti-reflection film according to Embodiment 6.

As shown in FIG. 6, the anti-reflection film of Embodiment 6 shows reflectances not greater than 1.0% in the wavelength range of 350 nm~900 nm, and an average reflectance not greater than 0.6% for the wavelength range of 350 nm~800 nm.

Also, an optical lens with the anti-reflection film of Embodiment 6 applied to one or both surfaces thereof has shown a good transmittance over a wide range from the ultraviolet region through the infrared region.

In this way, according to the anti-reflection film of Embodiment 6, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 7

An anti-reflection film according to Embodiment 7 is deposited on abase material with a refractive index of 1.57~1.79, constructed of a film structure, as shown in Table 7 below, using $Ta_2O_5$ as a high-refractive-index material for the first, third, fifth and seventh layers from the side of the base material, $Al_2O_3$ as a middle-refractive-index material for the second, fourth and sixth layers, and $MgF_2$ as a low-refractive-index material for the eighth layer, upon the design wavelength λ being set to 500 nm.

TABLE 7

| | | Optical film-thickness (×λ/4) | |
|---|---|---|---|
| | | A | B |
| | | Base-material | Base-material |
| Layer | | refractive index | refractive index |
| number | Material | n = 1.57 | n = 1.79 |
| 1st layer | $Ta_2O_5$ | 0.08 | 0.25 |
| 2nd layer | $Al_2O_3$ | 0.68 | 0.34 |
| 3rd layer | $Ta_2O_5$ | 0.32 | 0.69 |
| 4th layer | $Al_2O_3$ | 0.22 | 0.11 |
| 5th layer | $Ta_2O_5$ | 1.71 | 1.17 |
| 6th layer | $Al_2O_3$ | 0.31 | 0.35 |
| 7th layer | $Ta_2O_5$ | 0.29 | 0.34 |
| 8th layer | $MgF_2$ | 1.00 | 1.07 |

The anti-reflection film of Embodiment 7 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 7 uses $Ta_2O_5$ as a high-refractive-index material, $Al_2O_3$ as a middle-refractive index material, and $MgF_2$ as a low-refractive-index material, materials are not limited to these. Any material having a similar refractive index to each of these materials can be used to obtain an anti-reflection film having an equivalent characteristic.

Figure 7:
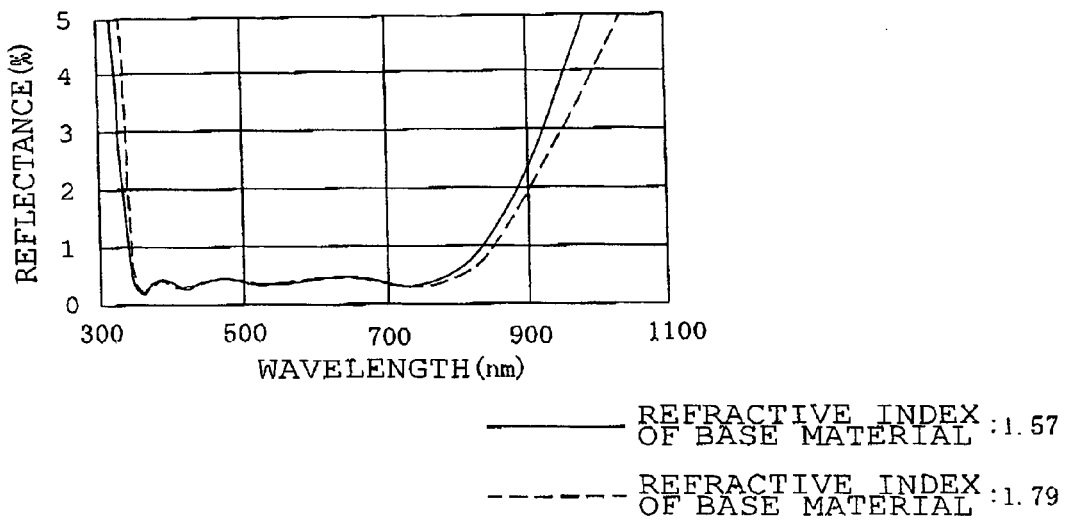
FIG. 7 is a spectral reflectance characteristic diagram of an anti-reflection film according to Embodiment 7.

As shown in FIG. 7, the anti-reflection film of Embodiment 7 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 7 applied to one or both surfaces thereof has shown a good transmittance over a wide range from the ultraviolet region through the infrared region.

In this way, according to the anti-reflection film of Embodiment 7, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 8

An anti-reflection film according to Embodiment 8 is deposited on a base material with a refractive index of 1.57~1.79, constructed of a film structure, as shown in Table 8 below, using $Ta_2O_5$ as a high-refractive-index material for the first, third, fifth and seventh layers from the side of the base material, $Al_2O_3$ as a middle-refractive-index material for the second and sixth layers, $SiO_2$ as a low-refractive-index material for the fourth layer, and $MgF_2$ as a low-refractive-index material for the eighth layer, upon the design wavelength $\lambda$ being set to 500 nm.

TABLE 8

| | | Optical film-thickness (×λ/4) | |
|---|---|---|---|
| | | A | B |
| Layer number | Material | Base-material refractive index n = 1.57 | Base-material refractive index n = 1.79 |
| 1st layer | $Ta_2O_5$ | 0.07 | 0.22 |
| 2nd layer | $Al_2O_3$ | 0.84 | 0.32 |
| 3rd layer | $Ta_2O_5$ | 0.39 | 0.50 |
| 4th layer | $SiO_2$ | 0.21 | 0.07 |
| 5th layer | $Ta_2O_5$ | 2.28 | 1.65 |
| 6th layer | $Al_2O_3$ | 0.41 | 0.33 |
| 7th layer | $Ta_2O_5$ | 0.31 | 0.32 |
| 8th layer | $MgF_2$ | 1.11 | 1.04 |

The anti-reflection film of Embodiment 8 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 8 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 8:
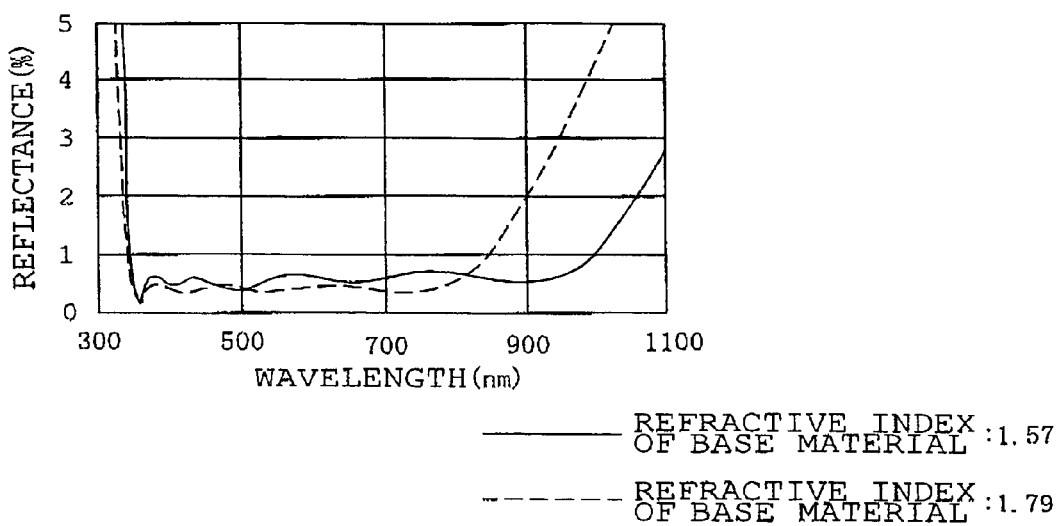
FIG. 8 is a spectral reflectance characteristic diagram of an anti-reflection film according to Embodiment 8.

As shown in FIG. 8, the anti-reflection film of Embodiment 8 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 8 applied to one or both surfaces thereof has shown a good transmittance over a wide range from the ultraviolet region through the infrared region.

In this way, according to the anti-reflection film of Embodiment 8, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 9

An anti-reflection film according to Embodiment 9 is deposited on abase material with a refractive index of 1.57~1.79, constructed of a film structure, as shown in Table 9 below, using $Ta_2O_5$ as a high-refractive-index material for the first, third, fifth and seventh layers from the side of the base material, $Al_2O_3$ as a middle-refractive-index material for the second layer, $SiO_2$ as a low-refractive-index material for the fourth and sixth layers, and $MgF_2$ as a low-refractive-index material for the eighth layer, upon the design wavelength $\lambda$ being set to 500 nm.

TABLE 9

| | | Optical film-thickness (×λ/4) | |
|---|---|---|---|
| | | A | B |
| Layer number | Material | Base-material refractive index n = 1.57 | Base-material refractive index n = 1.79 |
| 1st layer | $Ta_2O_5$ | 0.08 | 0.22 |
| 2nd layer | $Al_2O_3$ | 0.67 | 0.32 |
| 3rd layer | $Ta_2O_5$ | 0.35 | 0.50 |
| 4th layer | $SiO_2$ | 0.15 | 0.07 |
| 5th layer | $Ta_2O_5$ | 1.80 | 1.71 |
| 6th layer | $SiO_2$ | 0.21 | 0.23 |
| 7th layer | $Ta_2O_5$ | 0.33 | 0.36 |
| 8th layer | $MgF_2$ | 1.00 | 1.04 |

The anti-reflection film of Embodiment 9 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 9 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 9:
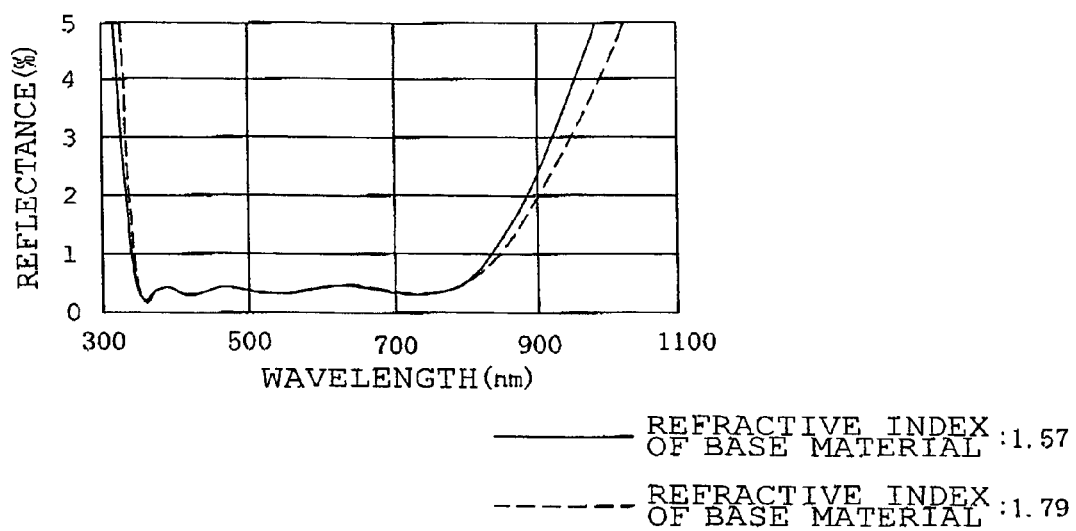
FIG. 9 is a spectral reflectance characteristic diagram of an anti-reflection film according to Embodiment 9.

As shown in FIG. 9, the anti-reflection film of Embodiment 9 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 9 applied to one or both surfaces thereof has shown a good transmittance over a wide range from the ultraviolet region through the infrared region.

In this way, according to the anti-reflection film of Embodiment 9, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 10

An anti-reflection film according to Embodiment 10 is deposited on abase material with a refractive index of 1.44~1.57, constructed of a film structure, as shown in Table 10 below, using $SiO_2$ as a low-refractive-index material for the first layer from the side of the base material, $Ta_2O_5$ as a high-refractive-index material for the third, fifth and seventh layers, $Al_2O_3$ as a middle-refractive-index material for the second, fourth and sixth layers, and $MgF_2$ as a low-refractive-index material for the eighth layer, upon the design wavelength $\lambda$ being set to 500 nm.

TABLE 10

| Layer number | Material | Optical film-thickness (×λ/4) | |
|---|---|---|---|
| | | A Base-material refractive index n = 1.44 | B Base-material refractive index n = 1.57 |
| 1st layer | $SiO_2$ | 1.02 | 0.22 |
| 2nd layer | $Al_2O_3$ | 1.08 | 1.30 |
| 3rd layer | $Ta_2O_5$ | 0.41 | 0.36 |
| 4th layer | $Al_2O_3$ | 0.30 | 0.39 |
| 5th layer | $Ta_2O_5$ | 0.78 | 0.67 |
| 6th layer | $Al_2O_3$ | 0.43 | 0.49 |
| 7th layer | $Ta_2O_5$ | 0.35 | 0.34 |
| 8th layer | $MgF_2$ | 1.09 | 1.11 |

TABLE 11

| Layer number | Material | Optical film-thickness (×λ/4) | |
|---|---|---|---|
| | | A Base-material refractive index n = 1.44 | B Base-material refractive index n = 1.57 |
| 1st layer | $SiO_2$ | 0.99 | 0.21 |
| 2nd layer | $Al_2O_3$ | 0.97 | 1.14 |
| 3rd layer | $Ta_2O_5$ | 0.33 | 0.33 |
| 4th layer | $SiO_2$ | 0.14 | 0.17 |
| 5th layer | $Ta_2O_5$ | 1.66 | 1.78 |
| 6th layer | $Al_2O_3$ | 0.31 | 0.31 |
| 7th layer | $Ta_2O_5$ | 0.30 | 0.28 |
| 8th layer | $MgF_2$ | 1.01 | 0.98 |

The anti-reflection film of Embodiment 10 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 10 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 10:
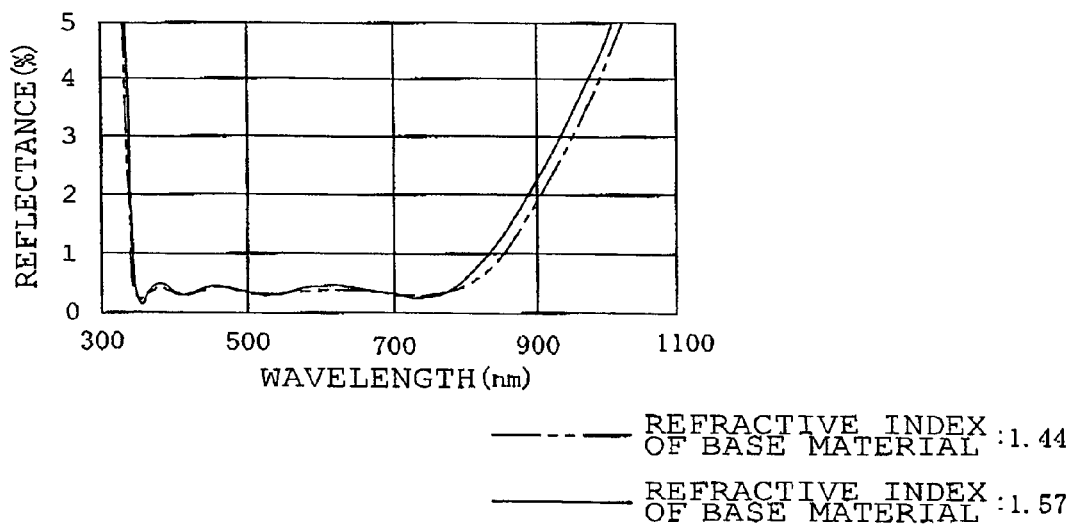
FIG. 10 is a spectral reflectance characteristic diagram of an anti-reflection film according to Embodiment 10.

As shown in FIG. 10, the anti-reflection film of Embodiment 10 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 10 applied to one or both surfaces thereof has shown a good transmittance over a wide range from the ultraviolet region through the infrared region.

In this way, according to the anti-reflection film of Embodiment 10, a high anti-reflection effect can be obtained over a wide wavelength range from the ultraviolet region through the infrared region. Also, since $Ta_2O_5$, which ha sa high refractive index, assures stable film forming and allows repeated use of the film material, is used as a high-refractive-index material, it is possible to form an anti-reflection film having a good optical characteristic at a low cost.

Embodiment 11

An anti-reflection film according to Embodiment 11 is deposited on a base material with a refractive index of 1.44~1.57, constructed of a film structure, as shown in Table 11 below, using $SiO_2$ as a low-refractive-index material for the first and fourth layers from the side of the base material, $Ta_2O_5$ as a high-refractive-index material for the third, fifth and seventh layers, $Al_2O_3$ as a middle-refractive-index material for the second and sixth layers, and $MgF_2$ as a low-refractive-index material for the eighth layer, upon the design wavelength λ being set to 500 nm.

The anti-reflection film of Embodiment 11 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 11 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 11:
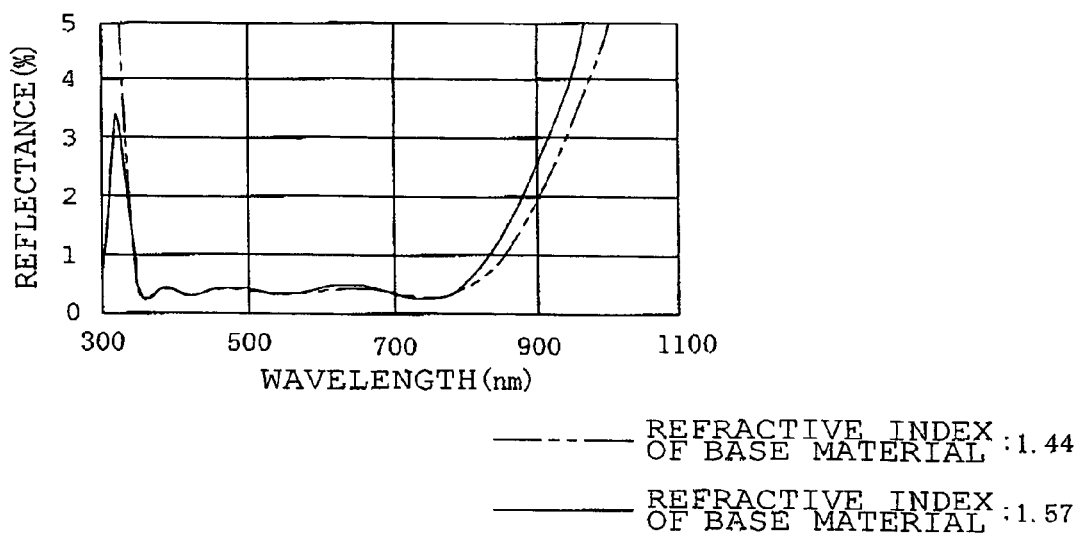
FIG. 11 is a spectral reflectance characteristic diagram of an anti-reflection film according to Embodiment 11.

As shown in FIG. 11, the anti-reflection film of Embodiment 11 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 11 applied to one or both surfaces thereof has shown a good transmittance over a wide range from the ultraviolet region through the infrared region.

In this way, according to the anti-reflection film of Embodiment 11, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 12

An anti-reflection film according to Embodiment 12 is deposited on a base material with a refractive index of 1.44~1.57, constructed of a film structure, as shown in Table 12 below, using $SiO_2$ as a low-refractive-index material for the first, fourth and sixth layers from the side of the base material, $Ta_2O_5$ as a high-refractive-index material for the third, fifth and seventh layers, $Al_2O_3$ as a middle-refractive-index material for the second layer, and $MgF_2$ as a low-refractive-index material for the eighth layer, upon the design wavelength λ being set to 50 nm.

TABLE 12

| | | Optical film-thickness (×λ/4) | |
|---|---|---|---|
| | | A | B |
| | | Base-material | Base-material |
| Layer | | refractive index | refractive index |
| number | Material | n = 1.44 | n = 1.57 |
| 1st layer | SiO$_2$ | 1.02 | 1.81 |
| 2nd layer | Al$_2$O$_3$ | 1.08 | 0.85 |
| 3rd layer | Ta$_2$O$_5$ | 0.46 | 0.31 |
| 4th layer | SiO$_2$ | 0.21 | 0.23 |
| 5th layer | Ta$_2$O$_5$ | 0.88 | 0.71 |
| 6th layer | SiO$_2$ | 0.29 | 0.30 |
| 7th layer | Ta$_2$O$_5$ | 0.41 | 0.40 |
| 8th layer | MgF$_2$ | 1.09 | 1.09 |

The anti-reflection film of Embodiment 12 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 12 uses Ta$_2$O$_5$ as a high-refractive-index material, Al$_2$O$_3$ as a middle-refractive index material, and SiO$_2$ and MgF$_2$ as low-refractive-index materials, materials are not limited to these. Any material having a similar refractive index to each of these materials can be used to obtain an anti-reflection film having an equivalent characteristic.

Figure 12:
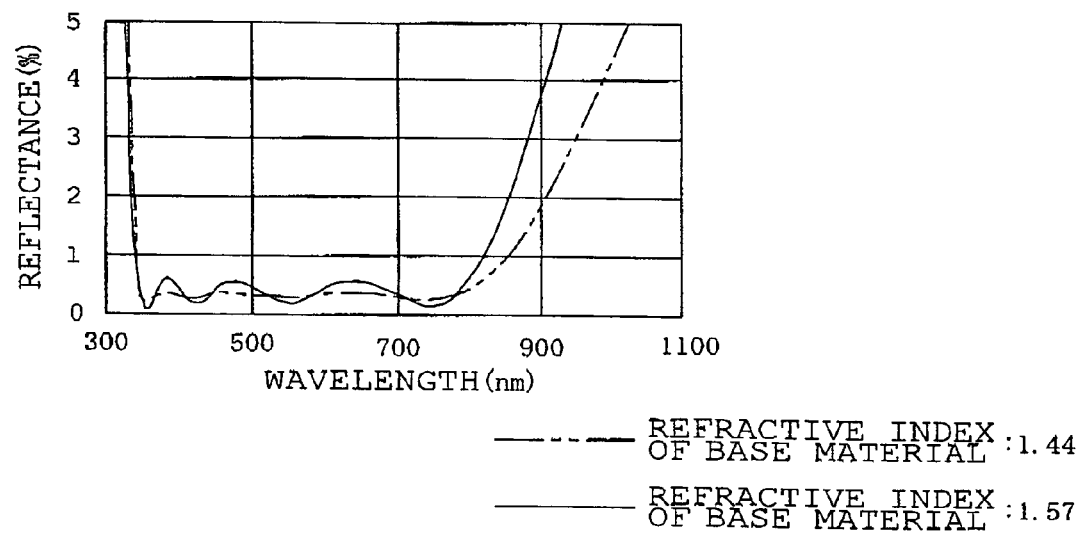
FIG. 12 is a spectral reflectance characteristic diagram of an anti-reflection film according to Embodiment 12.

As shown in FIG. 12, the anti-reflection film of Embodiment 12 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 12 applied to one or both surfaces thereof has shown a good transmittance over a wide range from the ultraviolet region through the infrared region.

In this way, according to the anti-reflection film of Embodiment 12, a high anti-reflection effect can be obtained over a wide wavelength range from the ultraviolet region through the infrared region. Also, since Ta$_2$O$_5$, which has a high refractive index, assures stable film forming and allows repeated use of the film material, is used as a high-refractive-index material, it is possible to form an anti-reflection film having a good optical characteristic at a low cost.

Embodiment 13

An anti-reflection film according to Embodiment 13 is deposited on a base material with a refractive index of 1.57, constructed of a film structure, as shown in Table 13 below, using Ta$_2$O$_5$ as a high-refractive-index material for the first, third, fifth, seventh and ninth layers from the side of the base material, SiO$_2$ as a low-refractive-index material for the second, fourth, sixth and eighth layers, and MgF$_2$ as a low-refractive-index material for the tenth layer, upon the design wavelength λ being set to 500 nm.

TABLE 13

| Embodiment 13 | | | | Embodiment 9 | | |
|---|---|---|---|---|---|---|
| Optical film- | | A | B | | | Optical film-thickness (×λ/4) |
| thickness (×λ/4) | | Base-material | Base-material | | | Base-material |
| Layer | | refractive index | refractive index | Layer | | refractive index |
| number | Material | n = 1.57 | n = 1.57 | number | Material | n = 1.57 |
| 1st layer | Ta$_2$O$_5$ | 0.12 | 0.11 | 1st layer | Ta$_2$O$_5$ | 0.08 |
| 2nd layer | SiO$_2$ | 0.34 | 0.52 | 2nd layer | Al$_2$O$_3$ | 0.67 |
| 3rd layer | Ta$_2$O$_5$ | 0.11 | 0.34 | | | |
| 4th layer | SiO$_2$ | 0.07 | 0.61 | | | |
| 5th layer | Ta$_2$O$_5$ | 0.35 | 0.35 | 3rd layer | Ta$_2$O$_5$ | 0.35 |
| 6th layer | SiO$_2$ | 0.15 | 0.10 | 4th layer | SiO$_2$ | 0.15 |
| 7th layer | Ta$_2$O$_5$ | 1.80 | 1.46 | 5th layer | Ta$_2$O$_5$ | 1.80 |
| 8th layer | SiO$_2$ | 0.21 | 0.22 | 6th layer | SiO$_2$ | 0.21 |
| 9th layer | Ta$_2$O$_5$ | 0.33 | 0.39 | 7th layer | Ta$_2$O$_5$ | 0.33 |
| 10th layer | MgF$_2$ | 1.00 | 1.05 | 8th layer | MgF$_2$ | 1.00 |

The anti-reflection film of Embodiment 13 is a result of replacement of the second layer (optical film-thickness: 0.67×λ/4) of Al$_2$O$_3$ as a middle-refractive-index material of Embodiment 9, upon application of the equivalent film theory, with a three-layer structure constructed of a layer (optical film-thickness: 0.34×λ/4) of SiO$_2$ as a low-refractive-index material, a layer (optical film-thickness: 0.11×λ/4) of Ta$_2$O$_5$ as a high-refractive-index material and a layer (optical film-thickness: 0.07×λ/4) of SiO$_2$ as a low-refractive-index material as shown in the column A of Table 13, to have an increased number of layers from the eight-layer structure of Embodiment 9 to a ten-layer structure.

The equivalent film is defined as a film resulting from replacement of a layer having a certain refractive index with a layered structure composed of a layer having a higher refractive index than that of the original layer and a layer having a lower refractive index than that of the original layer, and has an equivalent function to the original layer.

According to the anti-reflection film of Embodiment 13, the second layer made of a middle-refractive-index material is replaced with an equivalent film constructed of Ta$_2$O$_5$ as a high-refractive-index material and SiO$_2$ as a low-refractive-index material. However, application is not limited to this. Replacement may be made with an equivalent film constructed of another high-refractive-index material and another low-refractive-index material. Also, in a case where there are a plurality of layers made of middle-refractive-index materials, any of the layers may be replaced with an equivalent film. Furthermore, even if a layer is made of not a middle-refractive-index material but a high-refractive-index material or a low-refractive-index material, this layer can be replaced with an equivalent film constructed of a layer with a higher refractive index and a layer with a lower refractive index than the own refractive index of the original layer.

The anti-reflection film of Embodiment 13 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 13 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

It is noted that the column B of Table 13 shows a constitution in which the film thickness of each layer is adjusted on the basis of the constitution shown in the column A so that the spectral reflectance characteristic is much leveled.

Figure 13:
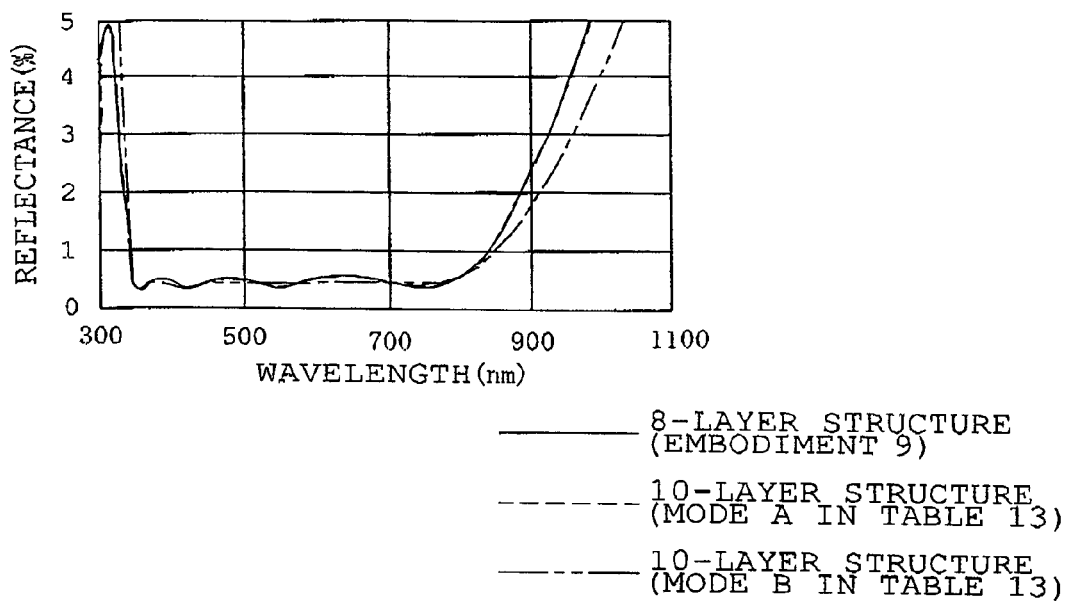
FIG. 13 is a spectral reflectance characteristic diagram of an anti-reflection film according to Embodiment 13.

As shown in FIG. 13, the anti-reflection film of Embodiment 13 shows reflectances not greater than 1.0% in the wavelength range of 350 nm~850 nm, and an average reflectance not greater than 0.5% for the wavelength range of 350 nm~800 nm. As apparent from FIG. 13, the spectral reflectance characteristic of the anti-reflection film of Embodiment 13 is closely similar to the spectral reflectance characteristic of Embodiment 9, which is the original.

Also, an optical lens with the anti-reflection film of Embodiment 13 applied to one or both surfaces thereof has shown a good transmittance over a wide range from the ultraviolet region through the infrared region.

Furthermore, as shown in FIG. 13, the spectral reflectance characteristic of the Table 13-column B constitution, in which the film thickness of each layer is optimized, is apparently much level in the wavelength range of 350 nm~800 nm relative to the spectral reflectance characteristic of the Table 13-column A constitution.

In this way, according to the anti-reflection film of Embodiment 13, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

By applying the equivalent film theory, it is possible to obtain, on the basis of a constitution of an anti-reflection film having a small number of layers, an anti-reflection film that shows a similar spectral characteristic even if having a larger number of layers. Furthermore, by optimizing the film thickness of each layer while maintaining the layered structure unchanged, it is possible to obtain an anti-reflection film that is effective for a wider range with its spectral reflectance characteristic being level.

Embodiment 14

An anti-reflection film according to Embodiment 14 is deposited on a base material with a refractive index of 1.44, constructed of a film structure, as shown in Table 14 below, using $SiO_2$ as a low-refractive-index material for the first and third layers from the side of the base material, $Ta_2O_5$ as a high-refractive-index material for the second, fourth, sixth and eighth layers, $Al_2O_3$ as a middle-refractive-index material for the fifth and seventh layers, and $MgF_2$ as a low-refractive-index material for the ninth layer, upon the design wavelength λ being set to 500 nm.

TABLE 14

| | Embodiment 14 | | Embodiment 10 | | |
|---|---|---|---|---|---|
| | Optical film-thickness (×λ/4) | | | Optical film-thickness (×λ/4) | |
| | | A | | | Base-material |
| Layer number | Material | Base-material refractive index n = 1.44 | Layer number | Material | refractive index n = 1.44 |
| 1st layer | $SiO_2$ | 1.02 | 1st layer | $SiO_2$ | 1.02 |
| 2nd layer | $Ta_2O_5$ | 0.21 | 2nd layer | $Al_2O_3$ | 1.08 |
| 3rd layer | $SiO_2$ | 0.49 | | | |
| 4th layer - 1 | $Ta_2O_5$ | 0.21 | | | |
| 4th layer - 2 | $Ta_2O_5$ | 0.40 | 3rd layer | $Ta_2O_5$ | 0.41 |
| 5th layer | $Al_2O_3$ | 0.30 | 4th layer | $Al_2O_3$ | 0.30 |
| 6th layer | $Ta_2O_5$ | 0.83 | 5th layer | $Ta_2O_5$ | 0.78 |
| 7th layer | $Al_2O_3$ | 0.43 | 6th layer | $Al_2O_3$ | 0.43 |
| 8th layer | $Ta_2O_5$ | 0.35 | 7th layer | $Ta_2O_5$ | 0.35 |
| 9th layer | $MgF_2$ | 1.09 | 8th layer | $MgF_2$ | 1.09 |

The anti-reflection film of Embodiment 14 is a result of replacement of the second layer (optical film-thickness: 1.08×λ/4) of $Al_2O_3$ as a middle-refractive-index material of Embodiment 10, upon application of the equivalent film theory, with a three-layer structure constructed of a layer (optical film-thickness: 0.22×λ/4) of $Ta_2O_5$ as a high-refractive-index material, a layer (optical film-thickness: 0.44×λ/4) of $SiO_2$ as a low-refractive-index material and a layer (optical film-thickness: 0.22×λ/4) of $Ta_2O_5$ as a high-refractive-index material as shown in the Table 14, to have an increased number of layers from the eight-layer structure of Embodiment 10 to a ten-layer structure. Regarding the anti-reflection film of Embodiment 14, since one of the $Ta_2O_5$ layers after replacement is adjacent to an original $Ta_2O_5$ layer, increase in number of layer is one. The fourth layer-2 is identical to the third layer of the anti-reflection film of Embodiment 10, and forms the fourth layer of the anti-reflection film of Embodiment 14 together with the fourth layer-1 (derived from replacement of the second layer of the anti-reflection film of Embodiment 10).

According to the anti-reflection film of Embodiment 14, the second layer made of a middle-refractive-index material is replaced with an equivalent film constructed of $Ta_2O_5$ as a high-refractive-index material and $SiO_2$ as a low-refractive-index material. However, application is not limited to this. Replacement may be made with an equivalent film constructed of another high-refractive-index material and another low-refractive-index material. Also, not the second layer made of the middle-refractive-index material but the fourth layer or the sixth layer made of the middle-refractive-index material may be replaced with an equivalent film or a plurality of layers made of middle-refractive-index materials may be replaced with equivalent films simultaneously. Furthermore, even if a layer is made of not a middle-refractive-index material but a high-refractive-index material or a low-refractive-index material, this layer can be replaced with an equivalent film constructed of a layer with a higher refractive index and a layer with a lower refractive index than the own refractive index of the original layer.

The anti-reflection film of Embodiment 14 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 14 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 14:
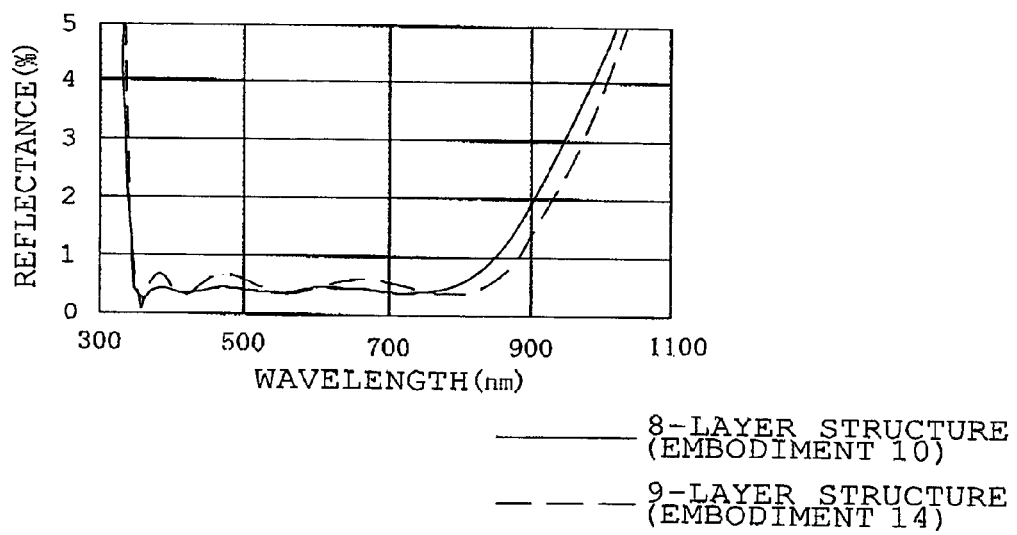
FIG. 14 is a spectral reflectance characteristic diagram of an anti-reflection film according to Embodiment 14.

As shown in FIG. 14, the anti-reflection film of Embodiment 14 shows reflectances not greater than 1.0% in the wavelength range of 350 nm~850 nm, and an average reflectance not greater than 0.6% for the wavelength range of 350 nm~800 nm. The spectral reflectance characteristic of the anti-reflection film of Embodiment 14 is, though rather wavy, similar to the spectral reflectance characteristic of Embodiment 10, which is the original.

Also, an optical lens with the anti-reflection film of Embodiment 14 applied to one or both surfaces thereof has shown a good transmittance over a wide range from the ultraviolet region through the infrared region.

In this way, according to the anti-reflection film of Embodiment 14, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost. Furthermore, by applying the equivalent film theory, it is possible to obtain, on the basis of a constitution of an anti-reflection film having a small number of layers, an anti-reflection film that has a greater number of layers just by one and shows a similar spectral characteristic.

Embodiments of microscopes that include optical lenses provided with anti-reflection films of the above-described embodiments are described below. In the following embodiments and the relevant drawings, similar component members are denoted by same reference symbols.

Embodiment 15

Figure 15:
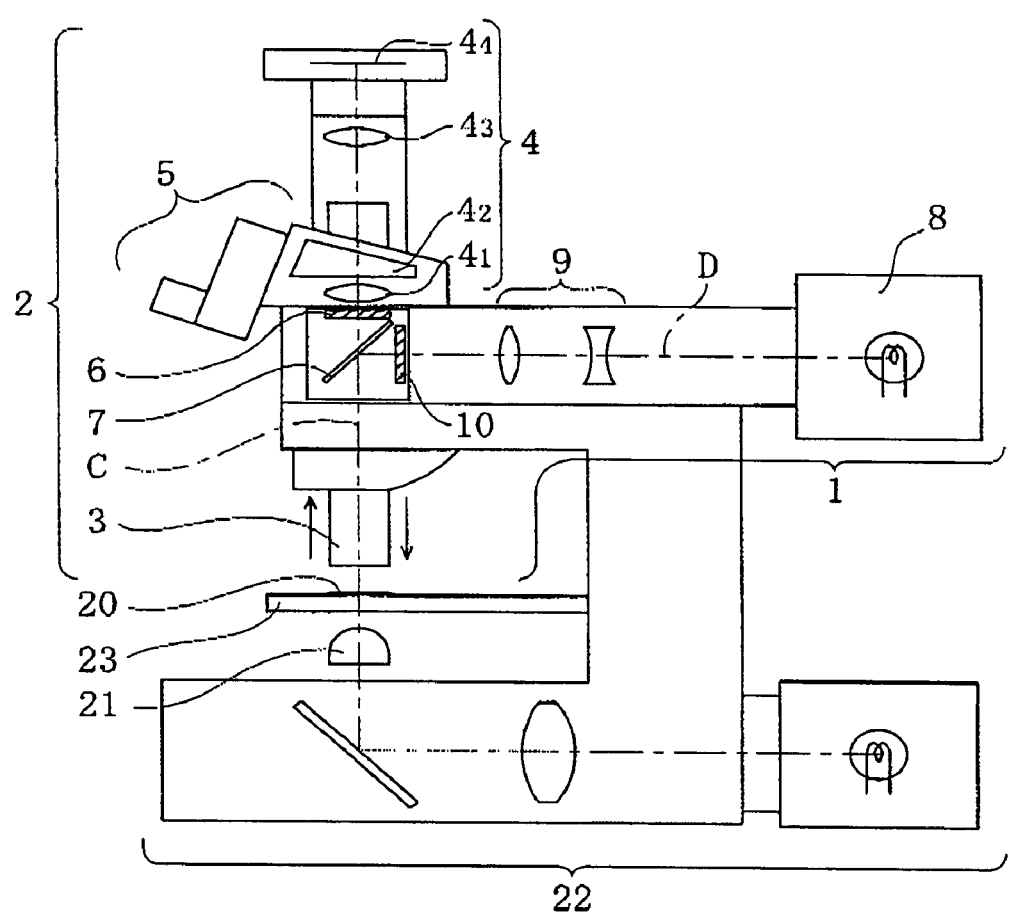
FIG. 15 is a schematic configuration diagram of a microscope having optical elements with anti-reflection films applied thereto according to Embodiment 15 of the present invention.

As shown in FIG. 15, a microscope according to Embodiment 15 has a reflecting illumination optical system 1 for laying a sample 20 under reflecting illumination with light and an observation optical system 2 for observation of light from the sample 20, and is provided with an objective optical system 3 arranged in a path of rays common to the reflecting illumination optical system 1 and the observation optical system 2.

The observation optical system 2 has an image-pickup optical system 4 that picks up an image from the sample 20, an eyepiece optical system 5 that forms an image from the sample 20 on a pupil of an observer, an absorption filter 6, a dichroic mirror 7, and the objective optical system 3.

The image-pickup optical system 4 has a lens $4_1$, a path-splitting prism $4_2$, a lens $4_3$, and an image-pickup device $4_4$. The image-pickup device $4_4$ is constructed of a solid-state image sensor such as a CCD or CMOS or a silver-halide film. The path-splitting prism $4_2$ has such a spectral characteristic as to split light from the lens $4_1$ into a path toward the eyepiece optical system 5 and a path toward the image-pickup device $4_4$.

The image-pickup optical system 4 may be formed of a housing unit that includes the lens $4_1$ and the path-splitting prism $4_2$, an adapter unit that includes the lens $4_3$, and an image-pickup unit that includes the image-pickup device $4_4$, and these three units may be constructed to achieve removable mount on each other. In this case, the image-pickup unit may specifically include a dust protection glass, a lowpass filter, a cover glass such as a CCD, an infrared cutoff filter, etc.

The absorption filter 6 has such a spectral characteristic as to transmit a fluorescence wavelength and interrupt light with wavelengths shorter than the fluorescence wavelength.

The dichroic mirror 7 has such a spectral characteristic as to reflect exciting light and transmit light with wavelengths other than the exciting light.

The reflecting illumination optical system 1 includes a light source 8, lenses 9, an excitation filter 10 and the dichroic mirror 7, which are arranged in a path D of rays that perpendicularly intersects a path C of rays between the absorption filter 6 in the observation optical system 2 and the objective optical system 3, and the objective lens 3.

The dichroic mirror 7 is disposed at a position where the path C intersects the path D.

The excitation filter 10 has such a spectral characteristic as to transmit exciting light and interrupt wavelengths other than the exciting light.

In addition, the reference numeral 21 denotes a condenser lens, the reference numeral denotes a transmitting illumination optical system, and the reference numeral 23 denotes a stage.

Regarding the excitation filter 10, one that is set for a transmission wavelength band within a range from ultraviolet light through infrared light can be used.

Regarding the absorption filter 6, one that is set for a transmission wavelength band within a range from visible light through infrared light can be used.

Although not shown in the drawing, the eyepiece optical system 5 is provided with an infrared cutoff filter that interrupts infrared light and transmits visible light.

Optical elements included in the reflecting illumination optical system 1, such as lenses 9, are provided with one of the anti-reflection films as described in Embodiments 7–14 and shown in Tables 7–14.

Optical elements included in the image-pickup optical system 4, such as lenses 41 and 43 and the path-splitting prism 42, are provided with one of the anti-reflection films as described in Embodiments 1–6 and shown in Tables 1–6.

In a case where another optical element is arranged in a path of rays of the reflecting illumination optical system 1 besides the lenses 9, this optical element may be provided with an anti-reflection film shown in Tables 7–14. Also, in a case where another optical element is arranged in a path of rays of the image-pickup optical system 4 besides the lenses $4_1$ and $4_3$ and the path-splitting prism $4_2$, or where, for example, a dust protection cover glass, a low pass filter, a cover glass such as a CCD, or an infrared cutoff filter is arranged, this optical element may be provided with an anti-reflection film of Tables 1–6.

In the microscope of Embodiment 15 thus configured, light emitted from the light source 8 passes the lenses 9, and, via the excitation filter 10, exciting light is transmitted and light with wavelengths other than the exciting light is interrupted. The light transmitted through the excitation filter 10 is reflected at the dichroic mirror 7, and illuminates the sample 20 via the objective optical system 3.

Exciting light reflected at the sample 20 and fluorescence emitted at the sample 20 are incident on the dichroic mirror 7 via the objective optical system 3. Of light incident on the dichroic mirror 7, the exciting light is interrupted at the dichroic mirror 7, and light with wavelengths other than the exciting light is transmitted through the dichroic mirror 7 and is incident on the absorption filter 6. Of light incident on the absorption filter 6, light with wavelengths shorter than the fluorescence is interrupted at the absorption filter 6, and the fluorescence and light with wavelengths longer than the fluorescence are transmitted through the absorption filter 6 and incident on the path-splitting prism $4_2$ via the lens $4_1$, to be split at the path-splitting prism $4_2$. Fluorescence in one of split paths split at the path-splitting prism $4_2$ is picked up at the image-pickup element $4_4$ via the lens $4_3$. Regarding fluorescence in the other of the split paths split at the path-splitting prism $4_2$, fluorescence with wavelengths other than infrared light is transmitted and imaged on a pupil of an observer via the eyepiece optical system 5 upon infrared light being interrupted via the infrared cutoff filter not shown.

The microscope of Embodiment 15 is designed so that light in a wavelength band within a range from ultraviolet light through infrared light passes the reflecting illumination optical system 1, and that fluorescence in a wavelength band within a range from visible light through infrared light passes the image-pickup optical system 4.

Thus, according to the microscope of Embodiment 15, optical elements included in the reflecting illumination optical system 1, such as the lenses 9, are provided with one of the anti-reflection films as described in Embodiments 7–14 and shown in Tables 7–14, to achieve good anti-reflection effect over a wide wavelength range from the ultraviolet region through the infrared region, especially in the ultraviolet region. Consequently, light to be used for the reflecting illumination optical system 1, which is in the wavelength range from ultraviolet light through infrared light, is made transmitted at a high transmittance with reflectance being stayed as low as possible, so that exciting light is selected without loss of amount of light for irradiation.

Also, optical elements included in the image-pickup optical system 4, such as the lenses $4_1$ and $4_3$ and the path-splitting prism $4_2$, are provided with one of the anti-reflection films as described in Embodiments 1–6 and shown in Tables 1–6, to achieve good anti-reflection effect over a wide wavelength range from the ultraviolet region through the infrared region. Consequently, fluorescence to be used for the image-pickup optical system 4, which is in the wavelength range from visible light through infrared light, is made transmitted at a high transmittance with reflectance being stayed as low as possible, so that observation is effectively performed without loss of amount of light.

It is noted that the anti-reflection films of Embodiments 7–14 are constructed of a larger number of layers and achieve higher anti-reflection performance in the ultraviolet region than the anti-reflection films of Embodiments 1–6, but they are more costly for it.

Thus, the microscope of Embodiment 15 is configured so that only optical elements such as the lenses 9 included in the reflecting illumination optical system 1, in which light in the ultraviolet region is possibly used, are provided with anti-reflection films of Embodiments 7–14, which have high anti-reflection performance in the ultraviolet region, and that optical elements such as the lenses $4_1$ and $4_3$ and the path-splitting prism $4_2$ included in the image-pickup optical system 4, in which light in the ultraviolet region is not used, are provided with any one of anti-reflection films of Embodiments 1–6, which costs lower than any one of anti-reflection films of Embodiments 7–14. Therefore, it is possible to obtain a microscope that achieves optimum balance between cost performance and anti-reflection effect.

Embodiment 16

Figure 16A:
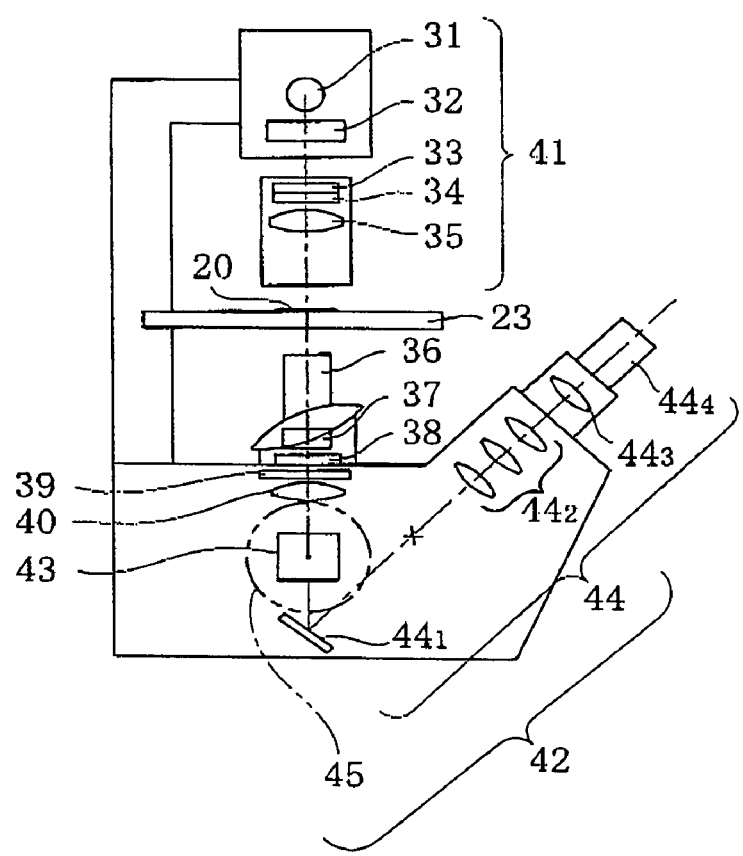
FIGS. 16A–16B are schematic configuration diagrams of a microscope having optical elements with anti-reflection films applied thereto according to Embodiment 16 of the present invention, where 16A shows the optical configuration excluding an image-pickup optical system, and 16B shows the optical configuration of the image-pickup optical system as viewed from the viewing direction of an eyepiece optical system of the microscope shown in FIG. 16A.

As shown in FIG. 16A, a microscope according to Embodiment 16 has a transmitting illumination optical system 41 for laying a sample 20 under transmitting illumination with light, and an observation optical system 42 for observation of light from the sample 20.

The transmitting illumination optical system 41 is configured to have a light source 31, an infrared transmitting filter 32 that interrupts wavelengths other than infrared light, a polarizer 33, a DIC prism 34 arranged on the sample side of the polarizer 33, and a condenser lens 35 that illuminates the sample 20. The infrared transmitting filter 32 is insertably and removably arranged in a path of rays between the light source 31 and the polarizer 33.

Figure 16B:
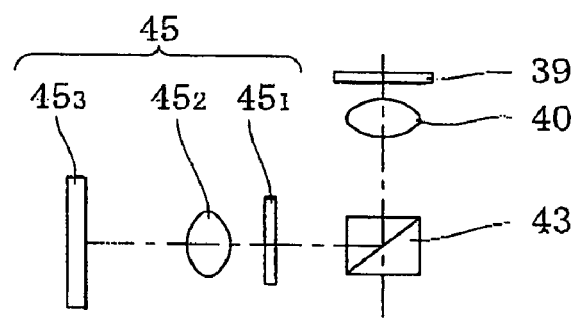

The observation optical system 42 is configured to have an objective optical system 36, a Nomarski prism 37, an analyzer 38, a filter 39, a lens 40, a dichroic mirror 43 as a path-splitting means for splitting the path of rays passing the analyzer 38, an eyepiece optical system 44 arranged in one (transmission path in FIG. 16A) of the split paths split at the dichroic mirror 43, and an image-pickup optical system 45 arranged in the other (reflection path in FIG. 16B) of the split paths split at the dichroic mirror 43.

Although the number of the image-pickup optical system 45 referred to in this embodiment is one, the image-pickup optical system 45 may be provided in a plurality in accordance with application of the microscope.

Also, the image-pickup optical system 45 may extend in a direction different from the direction in this embodiment in accordance with requirement.

The eyepiece optical system 44 is configured to have a mirror $44_1$, relay lenses $44_2$, an imaging lens $44_3$, and an eyepiece $44_4$. Also, in the path of rays of the eyepiece optical system 44, an infrared cutoff filter (not shown in the drawing) that interrupts infrared light and transmits visible light is provided, to cut off infrared light from light from the sample 20 so that visible light is imaged on a pupil of an observer.

The image-pickup optical system 45 is configured to include a filter 45₁, a lens 45₂, and an image-pickup element 45₃, so that an image by visible light and infrared light from the sample 20 is picked up at the image-pickup element 45₃.

Optical elements arranged in a path of rays from the transmitting illumination optical system 41 through the image-pickup optical system 45 (for example, the condenser lens 35, the objective optical system 36, the lenses 40 and 45₂) are provided with one of the anti-reflection films as described in Embodiments 1–6 and shown in Tables 1–6.

In a case where another optical element is arranged in the path of rays from the transmitting illumination optical system 41 through the image-pickup optical system 45 besides the condenser lens 35, the objective optical system 36, and the lenses 40 and 45₂, this optical element may be provided with an anti-reflection film shown in Tables 1–6.

In the microscope of Embodiment 16 thus configured, in a case where differential interference observation is performed using infrared light, the infrared transmitting filter 32 is inserted in the path of rays. Of light emitted from the light source 31, infrared light is transmitted and light with wavelengths other than the infrared light is interrupted via the infrared transmitting filter 32. The infrared light transmitted through the infrared transmitting filter 32 illuminates the sample 20 via the polarizer 33, the DIC prism 34, and the condenser lens 35.

Infrared light transmitted through the sample 20 is incident on the dichroic mirror 43 via the Nomarski prism 37, the analyzer 38, the filter 39, and the lens 40. Infrared light transmitted through the dichroic mirror 43 is interrupted by the infrared cutoff filter not shown but arranged in the eyepiece optical system 44. Infrared light reflected at the dichroic mirror 43 is formed as an infrared differential interference image on the image-pickup element 45₃ via the filter 45₁ and the lens 45₂, to be picked up via the image-pickup element 45₃.

In a case where differential interference observation is performed using visible light, the infrared transmitting filter 32 is removed from the path of rays. Visible light emitted from the light source 31 illuminates the sample 20 via the polarizer 33, the DIC prism 34, and the condenser lens 35.

Visible light transmitted through the sample 20 is incident on the dichroic mirror 43 via the Nomarski prism 37, the analyzer 38, the filter 39, and the lens 40. Visible light transmitted through the dichroic mirror is formed on a pupil of an observer as a differential interference image via the mirror 44₁, the relay lenses 44₂, the imaging lens 44₃, and the eyepiece 44₄. Visible light reflected at the dichroic mirror 43 is formed as a differential interference image on the image-pickup element 45₃ via the filter 45₁ and the lens 45₂, to be picked up via the image-pickup element 45₃.

In this way, in the microscope of Embodiment 16, paths of rays except the path after the infrared cutoff filter, not shown in the drawing, of the eyepiece optical system 44 are designed to allow transmission of a wavelength band within a range from visible light through infrared light.

Thus, according to the microscope of Embodiment 16, optical elements arranged in the path of rays from the transmitting illumination optical system 41 through the image-pickup optical system 45 (for example, the condenser lens 35, the objective optical system 36, the lenses 40 and 45₂) are provided with any one of the anti-reflection films shown in Tables 1–6 of Embodiments 1–6, to achieve good anti-reflection effect over a wide wavelength range from the ultraviolet region through the infrared region. Consequently, transmission differential interference light is made transmitted at a high transmittance with reflectance being stayed as low as possible, so as to be effectively observed without loss of amount of light. Especially in a case of observation using infrared light, differential interference observation can be effectively made without loss of amount of light even in a depth of a sample.

Embodiment 17

Figure 17:
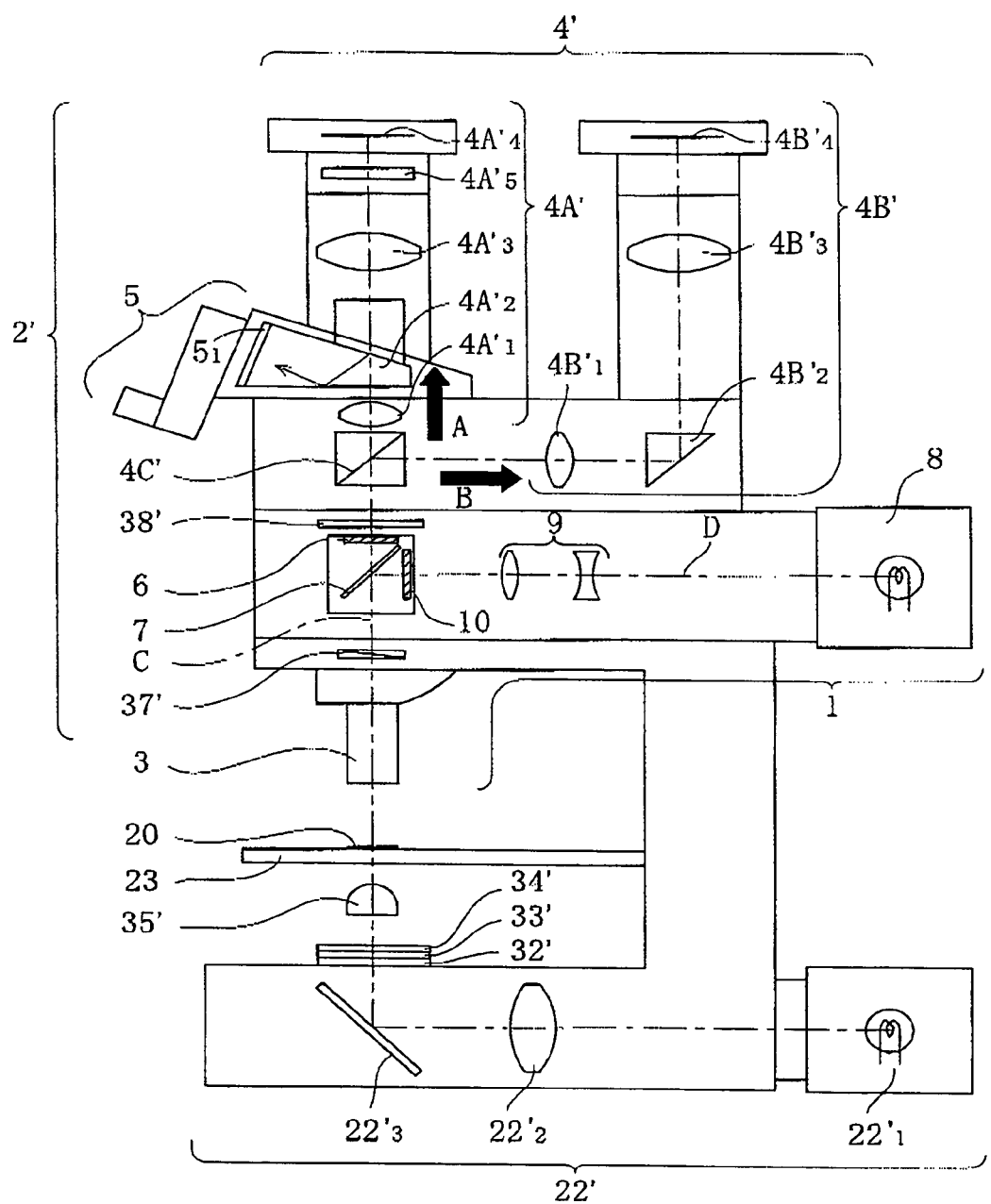
FIG. 17 is a schematic configuration diagram of a microscope having optical elements with anti-reflection films applied thereto according to Embodiment 17 of the present invention.

As shown in FIG. 17, a microscope according to Embodiment 17 has a reflecting illumination optical system 1 for laying a sample 20 under reflecting illumination with light, a transmitting illumination optical system 22 for laying the sample 20 under transmitting illumination with light, and an observation optical system 2' for observation of light from the sample 20, and is provided with an objective optical system 3 arranged in a path of rays common to the reflecting illumination optical system 1 and the observation optical system 2'.

The observation optical system 2 has an image-pickup optical system 4' that picks up an image from the sample 20, an eyepiece optical system 5 that forms an image from the sample 20 on a pupil of an observer, an absorption filter 6, a dichroic mirror 7, and the objective optical system 3.

The image-pickup optical system 4' has a first image-pickup optical system 4A' that picks up visible light, a second image-pickup optical system 4B' for observation of light in a wavelength range from visible light through infrared light, and a path-splitting member 4C'.

The path-splitting member 4C' has such a spectral characteristic as to reflect infrared light and transmit or reflect light with the remaining wavelengths, to split the path of rays into paths A and B for the first and second image-pickup optical systems 4A' and 4B'.

The first image-pickup optical system 4A' has a lens 4A'₁, a path-splitting prism 4A'₂, a lens 4A'₃, and an image-pickup device 4A'₄. In addition, an infrared cut off filter 4A'₅ is arranged between the lens 4A'₃ and the image-pickup device 4A'₄. The path-splitting prism 4A'₂ has such a spectral characteristic as to split light from the lens 4A'₁ into a path toward the image-pickup device 4A'₄ and a path toward the eyepiece optical system 5. The image-pickup device 4A'₄ is constructed of a solid-state image sensor such as a CMOS or a silver-halide film.

The second image-pickup optical system 4B' has a lens 4B'₁, a reflecting prism 4B'₂, a lens 4B'₃, and an image-pickup device 4B'₄. The image-pickup device 4B'₄ is constructed of a solid-state image sensor such as a CCD or a CMOS or a silver-halide film.

The absorption filter 6 has such a spectral characteristic as to transmit a fluorescence wavelength and interrupt light with wavelengths shorter than the fluorescence wavelength.

The dichroic mirror 7 has such a spectral characteristic as to reflect exciting light and transmit light with wavelengths other than the exciting light.

The reflecting illumination optical system 1 includes a light source 8, lenses 9, an excitation filter 10 and the dichroic mirror 7, which are arranged in a path D of rays that perpendicularly intersects a path C of rays between the absorption filter 6 in the observation optical system 2' and the objective optical system 3, and the objective lens 3.

The dichroic mirror 7 is disposed at a position where the path C intersects the path D.

The excitation filter 10 has such a spectral characteristic as to transmit fluorescence and interrupt wavelengths other than the fluorescence.

The transmitting illumination optical system 22 has a light source 22'$_1$, a lens 22'$_2$, a mirror 22'$_3$, an infrared transmitting filter 3$_2$', a polarizer 33', a DIC prism 34', and a condenser lens 35'.

Also, the microscope of Embodiment 17 is provided with an analyzer 38' insertably and removably arranged between the path-splitting member 4C' and the dichroic mirror 7, and a Nomarski prism 37' insertably and removably arranged between the objective optical system 3 and the dichroic mirror 7.

Regarding the exciting filter 10, one that is set for a transmission wavelength band within a range from ultraviolet light through infrared light can be used.

Regarding the absorption filter 6, one that is set for a transmission wavelength band within a range from visible light through infrared light can be used.

The eyepiece optical system 5 is provided with an infrared cutoff filter 5' that interrupts infrared light and transmits visible light.

Optical elements included in the reflecting illumination optical system 1, such as lenses 9, are provided with one of the anti-reflection films as described in Embodiments 7–14 and shown in Tables 7–14.

Optical elements included in the second image-pickup optical system 4B' (for example, lenses 4B'$_1$ and 4B'$_3$ and the reflecting prism 4B'$_2$) and optical elements included in the transmitting illumination optical system 22' (for example, the lens 22'$_2$ and the condenser lens 35') are provided with one of the anti-reflection films as described in Embodiments 1–6 and shown in Tables 1–6.

In a case where another optical element is arranged in a path of rays of the reflecting illumination optical system 1 besides the lenses 9, this optical element may be provided with an anti-reflection film shown in Tables 7–14. Also, in a case where another optical element is arranged in a path of rays of the second image-pickup optical system 4B' besides the lenses 4B'$_1$ and 4B'$_3$ and the reflecting prism 4B'$_2$, or where, for example, a dust protection cover glass is arranged in front of the image-pickup device 4B'$_4$, this optical element may be provided with an anti-reflection film of Tables 1–6. Further, in a case where another optical element is arranged in a path of rays of the transmitting illumination optical system 22' besides the lens 22'$_2$ and the condenser lens 35', this optical element may be provided with an anti-reflection film of Tables 1–6.

In the microscope of Embodiment 17 thus configured, light emitted from the light source 8 of the reflecting illumination optical system 1 passes the lenses 9, and, via the excitation filter 10, exciting light is transmitted and light with wavelengths other than the exciting light is interrupted. The light transmitted through the excitation filter 10 is reflected at the dichroic mirror 7, and illuminates the sample 20 via the objective optical system 3.

Exciting light reflected at the sample 20 and fluorescence emitted at the sample 20 are incident on the dichroic mirror 7 via the objective optical system 3. Of light incident on the dichroic mirror 7, the exciting light is interrupted at the dichroic mirror 7, and light with wavelengths other than the exciting light is transmitted through the dichroic mirror 7 and is incident on the absorption filter 6. Of light incident on the absorption filter 6, light with wavelengths shorter than the fluorescence is interrupted at the absorption filter 6, and the fluorescence and light with wavelengths longer than the fluorescence are transmitted through the absorption filter 6, to be incident on the path-splitting member 4C'. Of light incident on the path-splitting member 4C', all of infrared light and a half of light with wavelengths other than the infrared light are reflected at the path-splitting member 4C', to be introduced into the path B toward the second image-pickup optical system 4B'. The other half of light with wavelengths other than infrared light is transmitted through the path-splitting member 4C, to be introduced into the path A toward the first image-pickup optical system 4A'.

Fluorescence split into the path A is incident on the path-splitting prism 4A'$_2$ via the lens 4A'$_1$, to be split by the path-splitting prism 4A'$_2$. Fluorescence in one of split paths split at the path-splitting prism 4A'$_2$ passes the lens 4A'$_3$ and, upon a very small amount of infrared light transmitted through the path-splitting member 4C' being interrupted via the infrared cutoff filter 4A'$_4$, fluorescence with wavelengths other than infrared light is transmitted and is imaged on the image-pickup element 4A'$_4$ to be picked up there. Fluorescence in the other of split paths split at the path-splitting prism 4A'$_2$ passes the eyepiece optical system 5 and, upon a very small amount of infrared light transmitted through the path-splitting member 4C' being interrupted via the infrared cutoff filter 5$_1$, is imaged on a pupil of an observer.

On the other hand, fluorescence split into the path B is imaged on the image-pickup element 4B'$_4$ via the lens 4B'$_1$, the prism 4B'$_2$, and the lens 4B'$_3$, to be picked up there.

Light emitted from the light source 22'$_1$ passes the lens 22'$_2$, is reflected at the mirror 22'$_3$ and is incident on the infrared transmitting filter 32'. Of the incident light, with light with wavelengths other than infrared light being interrupted, infrared light is transmitted and illuminates the sample 20 via the DIC prism 34' and the condenser lens 35'. Infrared light transmitted through the sample 20 passes the objective optical system 3 and the Nomarski prism 37', is transmitted through the dichroic mirror and the absorption filter 6, and is incident on the path-splitting member 4C' as converted into infrared differential interference light via the polarizer 38'.

The infrared differential interference light incident on the path-splitting member 4C' is reflected at the path-splitting member 4C', to be introduced into the path B toward the image-pickup optical system 4B', not being introduced into the path A toward the image-pickup optical system 4A'.

The infrared differential interference light split into the path B is imaged on the image-pickup element 4B' via the lens 4B'$_1$, the prism 4B'$_2$ and the lens 4B'$_3$, and is picked up at the image-pickup element 4B'$_4$.

It is noted that a very small amount of infrared differential interference light is transmitted through the path-splitting member 4C', to be introduced into the path A. The infrared differential interference light introduced into the path A is incident on the path-splitting prism 4A'$_2$ and is split there. Infrared differential interference light in one of split paths split at the path-splitting prism 4A'$_2$ passes the lens 4A'$_3$ and is interrupted via the infrared cutoff filter 4A'$_4$. Infrared differential interference light in the other of the split paths split at the path-splitting prism 4A'$_2$ passes the eyepiece optical system 5 and is interrupted via the infrared cutoff filter 5$_1$. Therefore, the small amount of infrared differential interference light introduced into the path A as transmitted through the path-splitting member 4C' is not picked up by the image-pickup device 4A'$_4$ or imaged on the pupil of the observer via the eyepiece optical system 5.

In the microscope of Embodiment 17, light in a wavelength band within a range from ultraviolet light through infrared light is made to pass the reflecting illumination optical system 1, and fluorescence and differential interference light in a wavelength band within a range from visible light through infrared light is made to pass the image-pickup optical system 4.

Thus, according to the microscope of Embodiment 17, optical elements included in the reflecting illumination optical system 1, such as the lenses 9, are provided with one of the anti-reflection films as described in Embodiments 7–14 and shown in Tables 7–14, to achieve good anti-reflection effect over a wide wavelength range from the ultraviolet region through the infrared region, especially in the ultraviolet region. Consequently, light to be used for the reflecting illumination optical system 1, which is in the wavelength range from ultraviolet light through infrared light, is made transmitted at a high transmittance with reflectance being stayed as low as possible, so that exciting light is selected without loss of amount of light for irradiation.

Also, optical elements included in the second image-pickup optical system 4B' (for example, lenses $4B'_1$ and $4B'_3$ and the reflecting prism $4B'_2$) and optical elements included in the transmitting illumination optical system 22' (for example, the lens $22'_2$ and the condenser lens 35') are provided with one of the anti-reflection films as described in Embodiments 1–6 and shown in Tables 1–6, to achieve good anti-reflection effect over a wide wavelength range from the ultraviolet region through the infrared region. Consequently, fluorescence and differential interference light to be used for the second image-pickup optical system 4B', which is in the wavelength range from visible light through infrared light, is made transmitted at a high transmittance with reflectance being stayed as low as possible, so that observation is effectively performed without loss of amount of light.

According to the microscope of Embodiment 17, the image-pickup optical systems are arranged in the two paths A and B, respectively, and, via the path-splitting member 4C', visible light is split into the two paths A and B and infrared light is introduced only into the path B. Consequently, in a case where fluorescence observation is to be made with visible light, when only the light source 8 of the reflecting illumination optical system 1 is lit with the light source $22'_1$ of the transmitting illumination optical system 22' being unlit, visible fluorescence observation can be made in the path A, while infrared fluorescence observation can be made in the path B, to allow increase in number of colors of dyes, including visible fluorescence and infrared fluorescence, for fluorescence observation. Here, if the light source $22'_1$ of the transmitting illumination optical system 22' also is lit, visible fluorescence observation can be made in the path A, while infrared differential interference observation can be made in the path B. In this case, although infrared fluorescence also enters the path B, fluorescence is lower in light intensity than differential interference light and thus does not affect differential interference observation. Therefore, in the path B, infrared differential interference observation can be made, to make it possible to recognize an entire image even if a transparent sample is under observation. Also, since observation is made with infrared light, sample can be observed into its depth also.

Embodiment 18

Figure 18A:
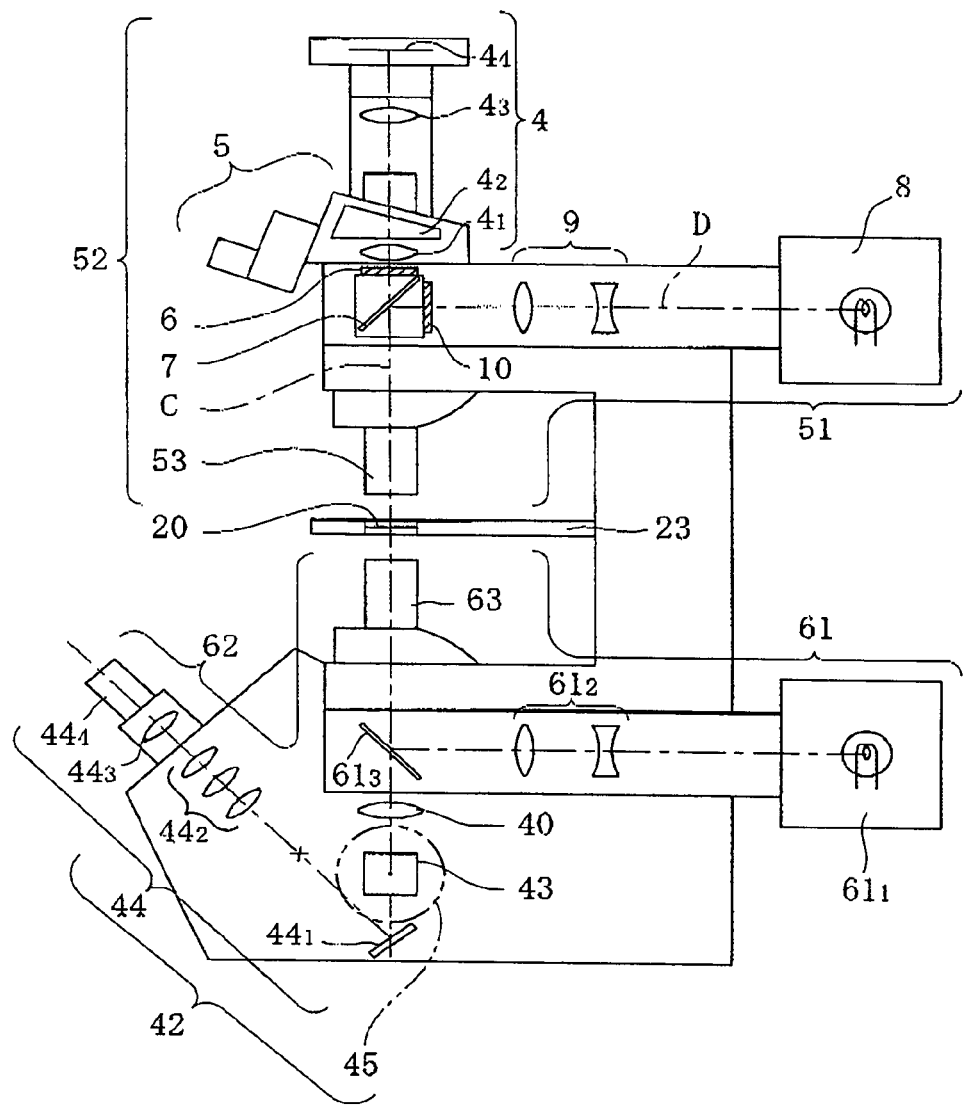
FIGS. 18A–18B are schematic configuration diagrams of a microscope having optical elements with anti-reflection films applied thereto according to Embodiment 18 of the present invention, where 18A shows the optical configuration excluding an image-pickup optical system, and 18B shows the optical configuration of the image-pickup optical system as viewed from the viewing direction of an eyepiece optical system of the microscope shown in FIG. 18A.

As shown in FIG. 18A, a microscope apparatus according to Embodiment 18 is configured to have an upright microscope and an inverted microscope.

The upright microscope has a first reflecting illumination optical system 51 for illuminating a sample 20 with light and a first observation optical system 52 for observation of light from the sample 20, and is provided with a first objective optical system 53 arranged in a path of rays common to the first reflecting illumination optical system 51 and the first observation optical system 52.

The first reflecting illumination optical system 51, the first observation optical system 52, and the first objective optical system 53 are configured in the same way as the reflecting illumination optical system 1, the observation optical system 2, and the objective optical system 3 in the microscope of Embodiment 15 shown in FIG. 15.

Optical elements included in the first reflecting illumination optical system 51, such as lenses 9, are provided with one of the anti-reflection films as described in Embodiments 7–14 and shown in Tables 7–14.

Optical elements included in an image-pickup optical system 4, such as lenses $4_1$ and $4_3$ and a reflecting prism $4_2$, are provided with one of the anti-reflection films as described in Embodiments 1–6 and shown in Tables 1–6.

In a case where another optical element is arranged in a path of rays of the first reflecting illumination optical system 51 besides the lenses 9, this optical element may be provided with an anti-reflection film shown in Tables 7–14. Also, in a case where another optical element is arranged in a path of rays of the image-pickup optical system 4 besides the lenses $4_1$ and $4_3$ and the reflecting prism $4_2$, or where, for example, a dust protection cover glass is arranged in front of the image-pickup device $4_4$, this optical element may be provided with an anti-reflection film of Tables 1–6.

The inverted microscope has a second reflecting illumination optical system 61 for illuminating the sample 20 with light and a second observation optical system 62 for observation of light from the sample 20, and is provided with a second objective optical system 63 arranged in a path of rays common to the second reflecting illumination optical system 61 and the second observation optical system 62.

The second reflecting illumination optical system 61 is configured to have a light source $61_1$, lenses $61_2$, a half mirror $61_3$, and the objective optical system 63.

Figure 18B:
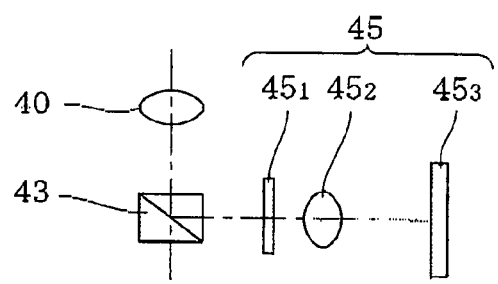

As shown in FIGS. 18A–18B, the second observation optical system 62 is configured to have the objective optical system 63, the half mirror $61_3$, a lens 40 similar to that shown in the microscope of Embodiment 16, a dichroic mirror 43, an eyepiece optical system 44, and an image-pickup optical system 45.

Optical elements such as the lenses $61_2$ included in the second reflecting illumination optical system 61, the objective optical system 63, and the lens 40, and optical elements included in the image-pickup optical system 45, such as a lens $45_2$, are provided with any one of the anti-reflection films described in Embodiments 1–6 and shown in Tables 1–6.

In a case where another optical element is arranged in a path of rays of the second reflecting illumination optical system 61 besides the lenses $61_2$, the objective optical system 63 and the lens 40, this optical element may be provided with the anti-reflection film of Tables 1–6.

In the upright microscope of Embodiment 18 thus configured, as in the case of the microscope of Embodiment 15, light in a wavelength band within a range from ultraviolet light through infrared light is made to pass the first reflecting illumination optical system 51, and fluorescence in a wavelength band within a range from visible light through infrared light is made to pass the image-pickup optical system 4.

Thus, according to the upright microscope of Embodiment 18, optical elements included in the first reflecting illumination optical system 51, such as the lenses 9, are provided with one of the anti-reflection films as described in Embodiments 7–14 and shown in Tables 7–14, to achieve good anti-reflection effect over a wide wavelength range from the ultraviolet region through the infrared region, especially in the ultraviolet region. Consequently, light to be used for the first reflecting illumination optical system 51, which is in the wavelength range from ultraviolet light through infrared light, is made transmitted at a high transmittance with reflectance being stayed as low as possible, so that exciting light is selected without loss of amount of light for irradiation.

Also, optical elements included in the image-pickup optical system 4, such as the lenses 4₁ and 4₃, are provided with one of the anti-reflection films as described in Embodiments 1–6 and shown in Tables 1–6, to achieve good anti-reflection effect over a wide wavelength range from the ultraviolet region through the infrared region. Consequently, fluorescence to be used for the image-pickup optical system 4, which is in the wavelength range from visible light through infrared light, is made transmitted at a high transmittance with reflectance being stayed as low as possible, so that observation is effectively performed without loss of amount of light.

In the inverted microscope of Embodiment 18, light emitted from the light source 61₁ of the second reflecting illumination optical system 61 is incident on the half mirror 61₃ via the lenses 61₂. Light reflected at the half mirror 61₃ illuminates the sample 20 via the objective optical system 63.

Light reflected at the sample 20 is incident on the half mirror 61₃ via the objective optical system 63. Light transmitted through the half mirror 61₃ is incident on the dichroic mirror 43 via the lens 40. Light transmitted through the dichroic mirror 43 is imaged on a pupil of an observer via a mirror 44₁, a relay lens 44₂, an imaging lens 44₃, and an eyepiece 44₄. Light reflected at the dichroic mirror 43 is imaged on an image-pickup element 45₃ via a filter 45 and the lens 45₂, and is picked up via the image-pickup element 45₃.

In the inverted microscope of Embodiment 18, light in a wavelength band within a range from visible light through infrared light is made transmitted through the second reflecting illumination optical system 61 and the image-pickup optical system 45.

Thus, according to the inverted microscope of Embodiment 18, optical elements such as the lenses 61₂ included in the second reflecting illumination optical system 61, the objective optical system 63, and the lens 40, and optical elements included in the image-pickup optical system 45, such as the lens 45₂, are provided with any one of the anti-reflection films shown in Tables 1–6 of Embodiments 1–6, to achieve good anti-reflection effect over a wide wavelength range from the ultraviolet region through the infrared region. Consequently, fluorescence to be used for the second reflecting illumination optical system 61 and the image-pickup optical system 45, which is in the wavelength range from ultraviolet light through infrared light, is made transmitted at a high transmittance with reflectance being stayed as low as possible, so that observation is effectively performed without loss of amount of light.

Embodiment 19

Figure 19:
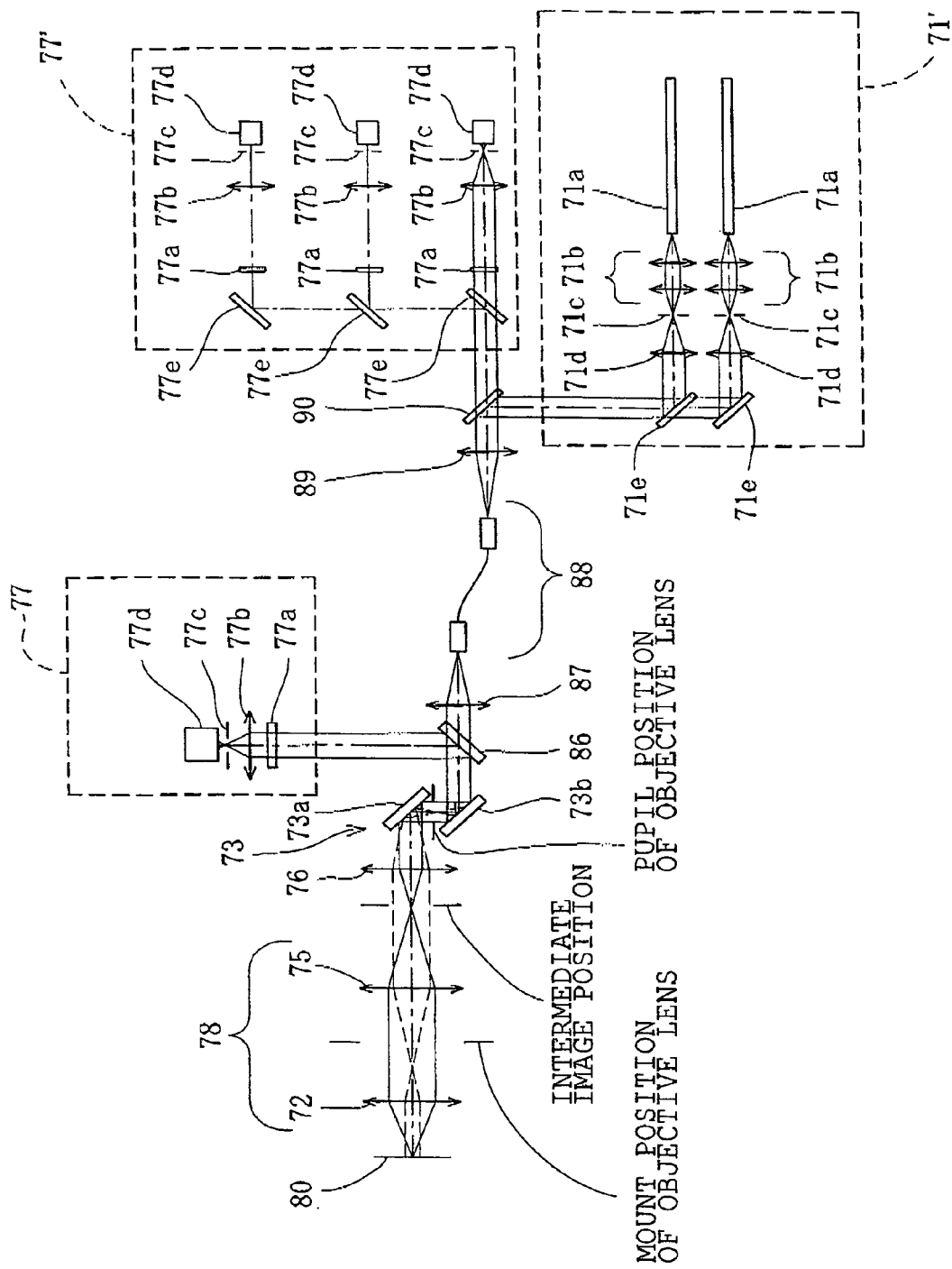
FIG. 19 is a schematic configuration diagram of a microscope having optical elements with anti-reflection films applied thereto according to Embodiment 17 of the present invention.

As shown in FIG. 19, a laser-scanning confocal fluorescence microscope according to Embodiment 19 includes a laser light source section 71', a replaceable objective lens 72, a scanner section 73 as a scanning means, a pupil projecting lens 76, an imaging lens 75, a first detecting optical system 77, and a second detecting optical system 77'.

The laser light source section 71' has a laser light source 71a and a collimating optical system composed of lenses 71b and 71d and a pinhole 71c. It is noted that the laser light source section 71' is provided with a plurality of units each including a light source 71a through a lens 71d, along with dichroic mirrors 71e in accordance with the number of the units.

Also, a laser driving section (not shown in the drawing) is coupled to the laser light source section 71', to drive emission of laser light from the laser light sources 71a.

The objective lens 72 forms an objective optical system 78 together with the imaging lens 75. The objective optical system 78 has a function of focusing exciting light from the laser light source section 71' on a sample 80 on a stage (not shown). The objective lens 72 is configured so that its back focal position is made conjugate with a position in the vicinity of the scanning section 73 by the imaging lens 75 and the pupil projecting lens 76. The imaging lens 75 has a function of forming an intermediate image of the sample 80.

The pupil projecting lens 76 is arranged between the scanner section 73 and the objective optical system 78.

The first detecting optical system 77 is configured to have a barrier filter 77a, a lens 77b, a confocal pinhole 77c and a light-receiving sensor 77d, to detect at the light-receiving sensor 77d fluorescence emitted at the sample 80 and passing the objective optical system 78 and the pupil projecting lens 76.

The second detecting optical system 77' is configured to have a plurality of units each including a barrier filter 77a through a light-receiving sensor 77d, along with dichroic mirrors 77e in accordance with the number of the units, to detect at the light-receiving sensor 77d fluorescence emitted at the sample 80 and passing the objective lens 78 and the pupil projecting lens 76.

Also, a dichroic mirror 90, a lens 89, a light conductor 88, a lens 87 and a dichroic mirror 86 are arranged between the laser light source section 71' and the scanner section 73.

The dichroic mirror 86 is configured to introduce exciting light from the laser light source section 71' to the sample 80 and to introduce fluorescence from the sample 80 to the first detecting optical system 77.

The light conductor 88 is constructed of an optical fiber such as a single-mode fiber or a multi-mode fiber. An end face of the light conductor 88 is conjugate with a position of the sample surface, and a core diameter at a fiber end face acts as a confocal pinhole. Accordingly, a pinhole 71c of the laser light source section 71' and a pinhole 77c of the second detecting optical system 77' may be removed from the path of rays or have a substantially large diameter in reference to the diffraction diameter. In a case where the light conductor 88 is a multi-mode fiber, its large fiber core diameter in reference to the diffraction diameter diminishes confocal effect, but makes it possible to take in bright fluorescence image. Thus, it is preferable to choose a fiber in accordance with observation purpose.

The dichroic mirror 90 is configured to introduce exciting light from the laser light source section 71' to the sample 80 and to introduce fluorescence from the sample 80 to the second detecting optical system 77'.

In addition, the microscope main body (not shown in the drawing) is provided with a focusing mechanism (not shown) for focusing of the objective lens 72.

Also, the laser-scanning confocal fluorescence microscope has an x-y-θ main-body moving mechanism (now shown) for positional adjustment of the main body in two-dimensional directions and for adjustment of observation angle θ in reference to the sample.

Also, the laser-scanning confocal fluorescence microscope of Embodiment 19 is connected with a processing and control device (not shown) such as a personal computer. The processing and control device is configured to perform wavelength control of laser light emitted upon drive by the laser driving section (not shown), selection of wavelengths for dichroic mirrors and filters, control of wavelength separating elements, drive control of the laser driving section, analysis and display of detected data received at the light-receiving sensors 77d of the detecting optical systems 77 and 77', drive control of the scanner section 73, drive control of the focusing mechanism, drive control of the x-y-θ main-body moving mechanism, etc.

Furthermore, in the laser-scanning confocal fluorescence microscope of Embodiment 19, optical elements arranged in a path of rays from the laser light source section 71' through the sample 80, that is, the objective lens 72, the imaging lens 75, the pupil projecting lens 76, the lenses 87, 89, 71b and 71d, etc. are provided with one of the anti-reflection films described in Embodiments 7–14 and shown in Tables 7–14.

Also, optical elements included in the second detecting optical system 77', such as the lenses 77b, are provided with one of the anti-reflection films described in Embodiments 1–6 and shown in Tables 1–6.

In a case where another optical element is arranged in the path of rays from the laser light source section 71' through the sample 80 besides the objective lens 72, the imaging lens 75, the pupil projecting lens 76, and the lenses 87, 89, 71b and 71d, this optical element may be provided with an anti-reflection film shown in Tables 7–14. Also, in a case where another optical element is arranged in the path of rays of the second detecting optical system 77' besides the lenses 77b, this optical element may be provided with an anti-reflection film of Tables 1–6.

In the laser-scanning confocal fluorescence microscope of Embodiment 19 thus configured, exciting light emitted from the laser light source 71a is focused on the pinhole 71c by the lens 71b, and is converted into a beam of parallel rays by the lens 71d. Then, the beam is introduced to the scanner section 73 via the dichroic mirror 71e, the dichroic mirror 90, the lens 89, the light conductor 88, the lens 87, and the lens 87. The beam thus introduced is shifted in two-dimensional directions in reference to the optical axis by individual turn of galvanometric mirrors 73a and 73b in the scanner section 73, and is focused on an intermediate position via the pupil projecting lens 76, to form a primary image. The exciting light focused on the intermediate position is incident on the sample 80 as a microspot beam via the imaging lens 75 and the objective lens 72. Here, the sample surface is scanned with the exciting light incident thereon by the scanner section 73.

Also, a back focal position of the objective lens is projected in the vicinity of the scanner section 73 by the imaging lens 75 and the pupil projecting lens 76.

Fluorescence excited at the sample 80 by irradiation with the exciting light is incident on the dichroic mirror 86 via the objective lens 72, the imaging lens 75, the pupil projecting lens 76, and the scanner section 73.

Light reflected at the dichroic mirror 86 is introduced into the first detecting optical system 77. Of light introduced into the first detecting optical system 77, only fluorescence that passes the confocal pinhole 77c via the barrier filter 77a and the lens 77b is detected by the light-receiving sensor 77d such as a photomultiplier.

Light transmitted through the dichroic mirror 86 is introduced into the second detecting optical system 77' via the lens 87, the light conductor 88, the lens 89, and the dichroic mirror 90. Of light introduced into the second detecting optical system 77', only fluorescence that passes the confocal pinhole 77c via the dichroic mirror 77e, the barrier filter 77a and the lens 77b is detected by the light-receiving sensor 77d such as a photomultiplier.

By arranging the light conductor 88 between the laser light source section 71' and the scanner section 73 as in the laser-scanning confocal fluorescence microscope of Embodiment 19, it is possible to give versatility to positional arrangement between the optical system from the scanner section 73 through the objective lens 72 in the microscope main body and the laser light source section 71'. As a result, the optical system in the microscope main body can be made compact suitable for observation of a sample in live condition (in vivo).

Also, in the laser-scanning confocal fluorescence microscope of Embodiment 19, if a near-infrared femtosecond pulse laser is applied to the laser light source section 71', it is possible to perform observation using the apparatus as a multiphoton-excitation fluorescence microscope.

This application can be achieved upon using the detecting optical systems 77 and 77' as detectors of multiphoton-excited fluorescence, selecting spectral characteristics of the dichroic mirrors 71e, 77e, 86 and 90, and setting the pinholes 77c and 77c to have sufficiently larger diameters than the diffraction diameter or removing them from the path of rays.

The laser-scanning confocal fluorescence microscope of Embodiment 19 is designed so that light in a wavelength band within a range from ultraviolet light through infrared light passes the path of rays from the laser light source section 71' through the sample 80, and that fluorescence in a wavelength band within a range from visible light through infrared light passes the second detecting optical system 77'.

Thus, according to the laser-scanning confocal fluorescence microscope of Embodiment 19, optical elements arranged in the paths of rays from the laser light source section 71' through the sample 80, such as the lenses 71d, 71b, 89 and 87, the pupil projecting lens 76, the imaging lens 75, and the objective lens 72, are provided with one of the anti-reflection films as described in Embodiments 7–14 and shown in Tables 7–14, to achieve good anti-reflection effect over a wide wavelength range from the ultraviolet region through the infrared region, especially in the ultraviolet region. Consequently, light to be used for the path of rays from the laser light source section 71' through the sample 80, which is in the wavelength range from ultraviolet light through infrared light, is made transmitted at a high transmittance with reflectance being stayed as low as possible, so that exciting light is selected without loss of amount of light for irradiation.

Also, optical elements included in the second detecting optical system 77', such as the lenses 77b, are provided with one of the anti-reflection films as described in Embodiments 1–6 and shown in Tables 1–6, to achieve good anti-reflection effect over a wide wavelength range from the ultraviolet region through the infrared region. Consequently, fluorescence to be used for the second detecting optical system 77', which is in the wavelength range from visible light through infrared light, is made transmitted at a high transmittance with reflectance being stayed as low as possible, so that detection is effectively performed without loss of amount of light.

Embodiment 20

Figure 20:
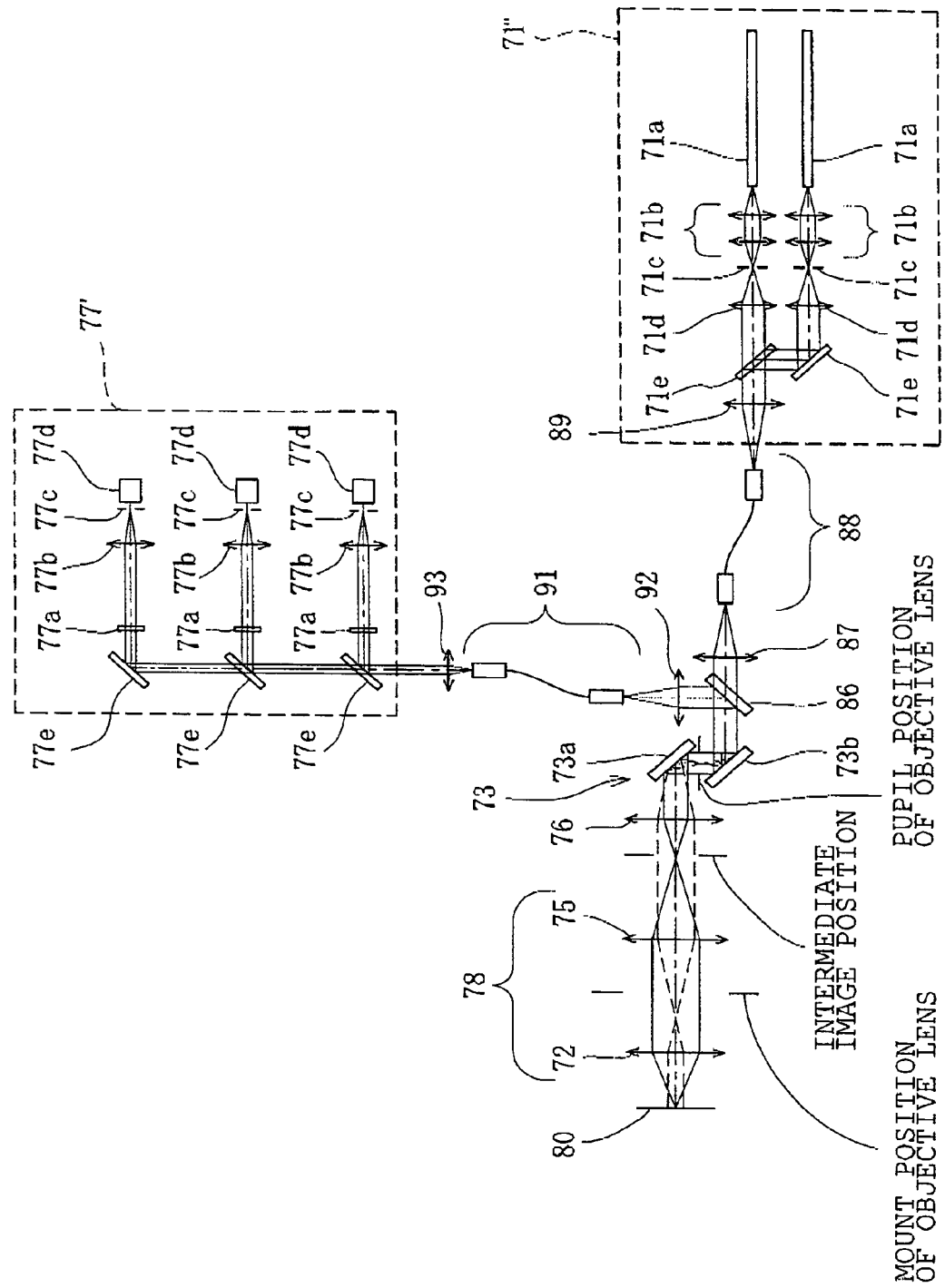
FIG. 20 is a schematic configuration diagram of a microscope having optical elements with anti-reflection films applied thereto according to Embodiment 20 of the present invention.

As shown in FIG. 20, a laser-scanning confocal fluorescence microscope according to Embodiment 20 is a modification example of Embodiment 19, and a lens 92, a light conductor 91 constructed of an optical fiber such as a single-mode fiber or a multi-mode fiber, and a lens 93 are arranged between a dichroic mirror 86 and an detecting optical system 77'. Also, the configuration is made so that exciting light from a light source section 71" is introduced to a sample 80 via a light conductor 88 and that fluorescence from the sample 80 is introduced into the detecting optical system 77'.

As in Embodiment 19, an end face of the optical fiber of each of the light conductors 88 and 91 is conjugate with a position of the sample surface, and a core diameter at a fiber end face acts as a confocal pinhole. Accordingly, a pinhole 71c of the light source section 71" and a pinhole 77c of the detecting optical system 77' may be removed from the path of rays or have a substantially large diameter in reference to the diffraction diameter. In a case where the light conductors 88 and 91 are multi-mode fibers, their large fiber core diameters in reference to the diffraction diameter diminish confocal effect, but make it possible to take in bright fluorescence image. Thus, it is preferable to choose fibers in accordance with observation purpose.

Also, in the laser-scanning confocal fluorescence microscope of Embodiment 20, optical elements arranged in a path of rays from the laser light source section 71" through the sample 80, that is, an objective lens 72, an imaging lens 75, a pupil projecting lens 76, lenses 87, 89, 71b and 71d, etc. are provided with one of the anti-reflection films described in Embodiments 7–14 and shown in Tables 7–14.

Also, optical elements included in the detecting optical system 77', such as lenses 77b, are provided with one of the anti-reflection films described in Embodiments 1–6 and shown in Tables 1–6.

In a case where another optical element is arranged in the path of rays from the laser light source section 71" through the sample 80 besides the objective lens 72, the imaging lens 75, the pupil projecting lens 76, and the lenses 87, 89, 71b and 71d, this optical element may be provided with an anti-reflection film shown in Tables 7–14. Also, in a case where another optical element is arranged in the path of rays of the detecting optical system 77' besides the lenses 77b, this optical element may be provided with an anti-reflection film of Tables 1–6.

According to the laser-scanning confocal fluorescence microscope of Embodiment 20 thus configured, the optical system in the microscope main body can be made much compact.

The laser-scanning confocal fluorescence microscope of Embodiment 20 is designed so that light in a wavelength band within a range from ultraviolet light through infrared light passes the path of rays from the laser light source section 71" through the sample 80, and that fluorescence in a wavelength band within a range from visible light through infrared light passes the detecting optical system 77'.

Thus, according to the laser-scanning confocal fluorescence microscope of Embodiment 20, optical elements arranged in the paths of rays from the laser light source section 71" through the sample 80, such as the lenses 71d, 71b, 89 and 87, the pupil projecting lens 76, the imaging lens 75, and the objective lens 72, are provided with one of the anti-reflection films as described in Embodiments 7–14 and shown in Tables 7–14, to achieve good anti-reflection effect over a wide wavelength range from the ultraviolet region through the infrared region, especially in the ultraviolet region. Consequently, light to be used for the path of rays from the laser light source section 71" through the sample 80, which is in the wavelength range from ultraviolet light through infrared light, is made transmitted at a high transmittance with reflectance being stayed as low as possible, so that exciting light is selected without loss of amount of light for irradiation.

Also, optical elements included in the detecting optical system 77', such as the lenses 77b, are provided with one of the anti-reflection films as described in Embodiments 1–6 and shown in Tables 1–6, to achieve good anti-reflection effect over a wide wavelength range from the ultraviolet region through the infrared region. Consequently, fluorescence to be used for the detecting optical system 77', which is in the wavelength range from visible light through infrared light, is made transmitted at a high transmittance with reflectance being stayed as low as possible, so that detection is effectively performed without loss of amount of light.

Embodiment 21

An anti-reflection film according to Embodiment 21 is deposited on abase material with a refractive index of 1.44~1.79, constructed of a film structure, as shown in Table 15 below, using $Ta_2O_5$ as a high-refractive-index material for the first, third, fifth and seventh layers from the side of the base material, $SiO_2$ as a low-refractive-index material for the second layer, $Al_2O_3$ as a middle-refractive-index material for the fourth and sixth layers, and $MgF_2$ as a low-refractive-index material for the eighth layer, upon the design wavelength $\lambda$ being set to 500 nm.

TABLE 15

| | | Optical film-thickness (×λ/4) | | |
|---|---|---|---|---|
| | | A | B | C |
| | | Base-material refractive index | Base-material refractive index | Base-material refractive index |
| Layer number | Material | n = 1.44 | n = 1.57 | n = 1.79 |
| 1st layer | $Ta_2O_5$ | 0.12 | 0.20 | 0.31 |
| 2nd layer | $SiO_2$ | 0.64 | 0.45 | 0.23 |
| 3rd layer | $Ta_2O_5$ | 0.35 | 0.51 | 0.76 |
| 4th layer | $Al_2O_3$ | 0.51 | 0.36 | 0.11 |
| 5th layer | $Ta_2O_5$ | 0.62 | 0.76 | 1.13 |
| 6th layer | $Al_2O_3$ | 0.51 | 0.46 | 0.36 |
| 7th layer | $Ta_2O_5$ | 0.34 | 0.35 | 0.34 |
| 8th layer | $MgF_2$ | 1.12 | 1.11 | 1.08 |

The anti-reflection film of Embodiment 21 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 21 uses $Ta_2O_5$ as a high-refractive-index material, $Al_2O_3$ as a middle-refractive index material, and $SiO_2$ and $MgF_2$ as low-refractive-index materials, materials are not limited to these. Any material having a similar refractive index to each of these materials can be used to obtain an anti-reflection film having an equivalent characteristic.

Figure 21:
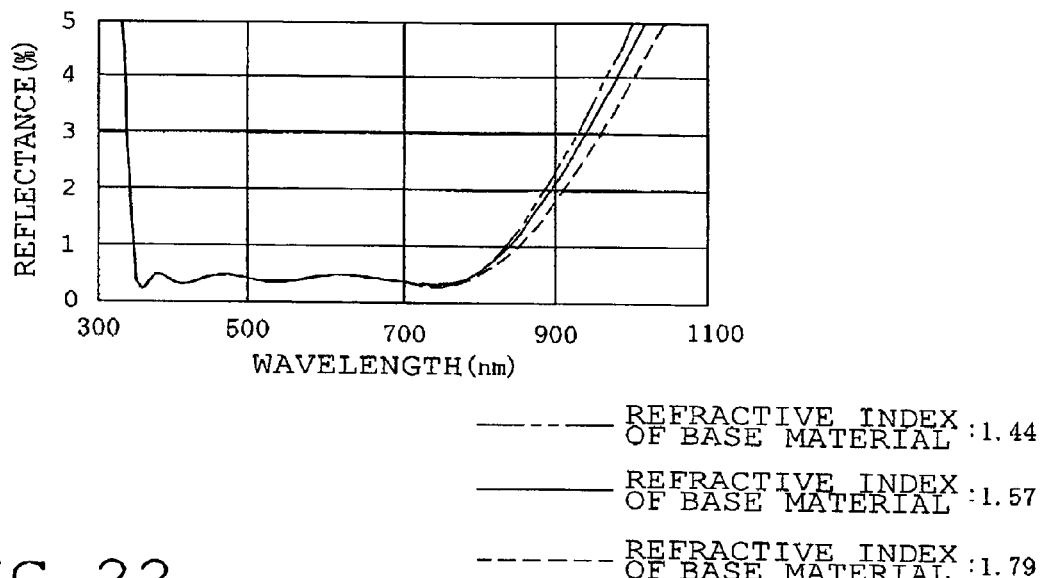
FIG. 21 is a spectral reflectance characteristic diagram of an anti-reflection film according to Embodiment 21.

As shown in FIG. 21, the anti-reflection film of Embodiment 21 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 21 applied to one or both surfaces thereof has shown a good transmittance over a wide range from the ultraviolet region through the infrared region.

In this way, according to the anti-reflection film of Embodiment 21, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

Embodiment 22

An anti-reflection film according to Embodiment 22 is deposited on a base material with a refractive index of 1.44~1.79, constructed of a film structure, as shown in Table 16 below, using $Ta_2O_5$ as a high-refractive-index material for the first, third, fifth and seventh layers from the side of the base material, $SiO_2$ as a low-refractive-index material for the second, fourth and sixth layers, and $MgF_2$ as a low-refractive-index material for the eighth layer, upon the design wavelength λ being set to 500 nm.

TABLE 16

| | | Optical film-thickness (×λ/4) | | |
| | | A | B | C |
| | | Base-material refractive index | Base-material refractive index | Base-material refractive index |
| Layer number | Material | n = 1.44 | n = 1.57 | n = 1.79 |
|---|---|---|---|---|
| 1st layer | $Ta_2O_5$ | 0.12 | 0.17 | 0.27 |
| 2nd layer | $SiO_2$ | 0.56 | 0.40 | 0.22 |
| 3rd layer | $Ta_2O_5$ | 0.38 | 0.44 | 0.55 |
| 4th layer | $SiO_2$ | 0.22 | 0.17 | 0.07 |
| 5th layer | $Ta_2O_5$ | 1.81 | 0.82 | 1.72 |
| 6th layer | $SiO_2$ | 0.20 | 0.21 | 0.23 |
| 7th layer | $Ta_2O_5$ | 0.31 | 0.33 | 0.36 |
| 8th layer | $MgF_2$ | 0.97 | 0.99 | 1.04 |

The anti-reflection film of Embodiment 22 is deposited by vacuum evaporation method in a vacuum region of $10^{-4}$~$10^{-6}$ Torrs. However, method is not limited to this; an anti-reflection film with equivalent characteristic can be obtained by sputtering method, ion plating method, or ion assist evaporation method also. Also, while the anti-reflection film of Embodiment 22 uses $Ta_2O_5$ as a high-refractive-index material, and $SiO_2$ and $MgF_2$ as low-refractive-index materials, materials are not limited to these. Any material having a similar refractive index to each of these materials can be used to obtain an anti-reflection film having an equivalent characteristic.

Figure 22:
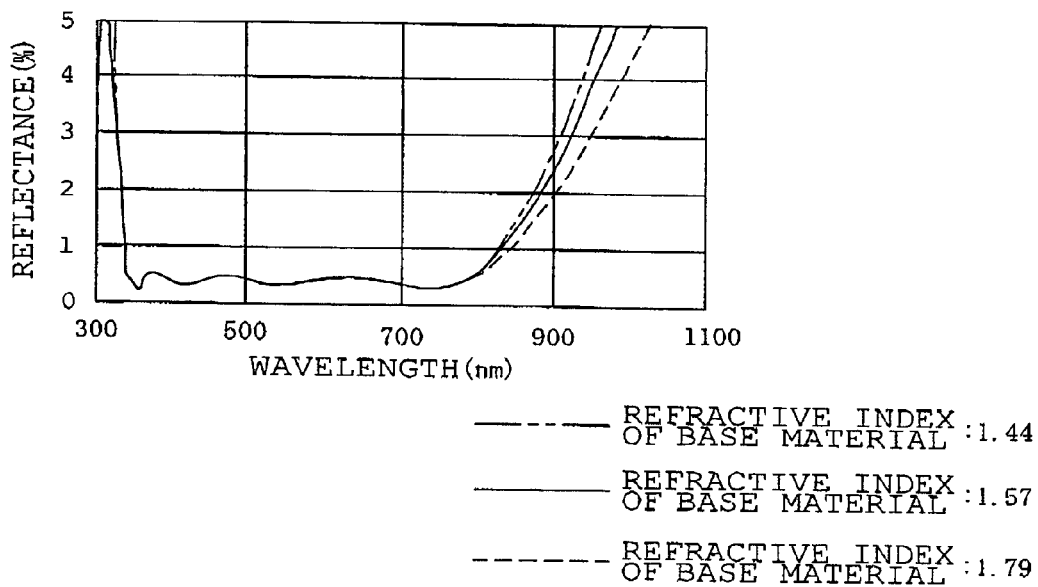
FIG. 22 is a spectral reflectance characteristic diagram of an anti-reflection film according to Embodiment 22.

As shown in FIG. 22, the anti-reflection film of Embodiment 22 shows reflectances not greater than 0.8% in the wavelength range of 350 nm~900 nm, and an average reflectance not greater than 0.5% for the wavelength range of 350 nm~800 nm.

Also, an optical lens with the anti-reflection film of Embodiment 22 applied to one or both surfaces thereof has shown a good transmittance over a wide range from the ultraviolet region through the infrared region.

In this way, according to the anti-reflection film of Embodiment 22, a high anti-reflection effect can be obtained over a wide wavelength range from the ultraviolet region through the infrared region. Also, since $Ta_2O_5$, which has a high refractive index, assures stable film forming and allows repeated use of the film material, is used as a high-refractive-index material, it is possible to form an anti-reflection film having a good optical characteristic at a low cost.

It is noted that the anti-reflection films of Embodiment 21 and Embodiment 22 are applicable, for example, to an objective lens for microscopes.

As described in reference to the individual embodiments above, according to the present invention, by specifying refractive index of a film material and film thickness for each layer, it is possible to obtain an anti-reflection film that can achieve high anti-reflection effect over a wide wavelength range from the ultraviolet region through the infrared region, a microscope having an optical element with such an anti-reflection film applied thereto, and an image-pickup device used in such a microscope.

What is claimed is:

1. An image-pickup unit that achieves removable mount on a microscope, comprising:
   an image-pickup device having an image-pickup element that picks up an image by the microscope; and
   a dust protection glass arranged in front of the image-pickup device,
   wherein the dust protection glass is provided with an anti-reflection film having a layered structure having first to sixth layers of films, in order from a surface of the dust protection glass, formed of a high-refractive-index material for each of the first, third and fifth layers, a low-refractive-index material or a middle-refractive-index material for each of the second and fourth layers, and a low-refractive-index material for the sixth layer, with a range of an optical film-thickness nd of each layer in reference to a design wavelength λ being "(0.13~0.35)×λ/4" for the first layer, "(0.18~0.75)×λ/4" for the second layer, "(0.28~2.31)×λ/4" for the third layer, "(0.26~0.92)×λ/4" for the fourth layer, "(0.20~0.37)×λ/4" for the fifth layer, and "(1.09~1.18)×λ/4" for the sixth layer.

* * * * *

UNITED STATES PATENT AND TRADEMARK OFFICE
CERTIFICATE OF CORRECTION

PATENT NO. : 7,075,714 B2
APPLICATION NO. : 10/932055
DATED : July 11, 2006
INVENTOR(S) : Atsushi Yonetani et al.

It is certified that error appears in the above-identified patent and that said Letters Patent is hereby corrected as shown below:

| Column | Line | |
|--------|------|---|
| 20 | 67 | Change "50 nm" to --500 nm--. |
| 27 | 2 | Change "lenses 41 and 43" to --lenses $4_1$ and $4_3$--. |
| 27 | 3 | Change "prism 42" to --prism $4_2$--. |

Signed and Sealed this

Thirteenth Day of March, 2007

JON W. DUDAS
*Director of the United States Patent and Trademark Office*